(12) United States Patent
Nieuwkerk et al.

(10) Patent No.: US 12,456,377 B2
(45) Date of Patent: Oct. 28, 2025

(54) SYSTEMS AND METHODS FOR ELECTRONIC SURVEILLANCE

(71) Applicant: Selex ES Inc., Greensboro, NC (US)

(72) Inventors: Willem Nieuwkerk, Greensboro, NC (US); Todd Child, Greensboro, NC (US)

(73) Assignee: Leonardo US Cyber and Security Solutions, LLC, Greensboro, NC (US)

( * ) Notice: Subject to any disclaimer, the term of this patent is extended or adjusted under 35 U.S.C. 154(b) by 266 days.

(21) Appl. No.: 18/110,923

(22) Filed: Feb. 17, 2023

(65) Prior Publication Data

US 2023/0274647 A1 Aug. 31, 2023

Related U.S. Application Data

(60) Provisional application No. 63/313,859, filed on Feb. 25, 2022.

(51) Int. Cl.
*G08G 1/00* (2006.01)
*G06Q 10/0833* (2023.01)
*G06V 20/62* (2022.01)

(52) U.S. Cl.
CPC ........... *G08G 1/20* (2013.01); *G06Q 10/0833* (2013.01); *G06V 20/625* (2022.01)

(58) Field of Classification Search
CPC ..... G01G 1/20; G06V 20/625; G06Q 10/0833
(Continued)

(56) References Cited

U.S. PATENT DOCUMENTS

| 3,656,111 A | 4/1972 | Royster, Sr. |
| 4,843,463 A | 6/1989 | Michetti |

(Continued)

FOREIGN PATENT DOCUMENTS

| AU | 2013201309 B2 | 8/2014 |
| CA | 2620630 C | 9/2014 |

(Continued)

OTHER PUBLICATIONS

Hoffman, Alwyn Jakobus and Albertus J. Pretorius: "SmartRoad; A new approach to law enforcement in dense traffic environments"; 2015 IEEE 18th International Conference on Intelligent Transportation Systems. IEEE, 2015; Year 2015.

(Continued)

*Primary Examiner* — Andrew Joseph Rudy
(74) *Attorney, Agent, or Firm* — Womble Bond Dickinson (US) LLP

(57) ABSTRACT

A system and method for monitoring, via collection systems mounted on vehicles, for one or more electronic signals associated with one or more selected locations. In an embodiment, the system may include a plurality of collection systems. Each collection system of the plurality of collection systems may be positioned on a respective vehicle of a plurality of vehicles. Each of the collection systems may include at least one sensor configured to collect electronic signals from proximal electronic devices and a communication circuitry to transmit collected electronic signals. The system may include an intelligence device receiving the transmitted collected electronic signals. The intelligence device may include a database and correlation circuitry to determine a correlation between one or more different electronic signals of the collected electronic signals.

20 Claims, 13 Drawing Sheets

(58) Field of Classification Search
USPC .......................................................... 701/23
See application file for complete search history.

(56) References Cited

U.S. PATENT DOCUMENTS

| | | | |
|---|---|---|---|
| 6,140,941 A | 10/2000 | Dwyer et al. |
| 6,340,935 B1 | 1/2002 | Hall |
| 6,538,580 B2 | 3/2003 | Bostrom |
| 6,650,765 B1 | 11/2003 | Alves |
| 6,754,368 B1 | 6/2004 | Cohen |
| 6,844,841 B1 | 1/2005 | Masciulli |
| 6,922,138 B2 | 7/2005 | Melvin |
| 6,959,869 B2 | 11/2005 | Tsikos et al. |
| 6,982,654 B2 | 1/2006 | Rau et al. |
| 7,046,169 B2 | 5/2006 | Bucholz et al. |
| 7,173,526 B1 | 2/2007 | Monroe |
| 7,227,974 B2 | 6/2007 | Kamijo et al. |
| 7,342,511 B2 | 3/2008 | Schuette |
| 7,344,284 B2 | 3/2008 | Lynam et al. |
| 7,382,280 B2 | 6/2008 | Long |
| 7,460,028 B2 | 12/2008 | Garibotto et al. |
| 7,465,108 B2 | 12/2008 | Brown |
| 7,482,910 B2 | 1/2009 | Melvin |
| 7,504,965 B1 | 3/2009 | Windover et al. |
| 7,535,793 B2 | 5/2009 | Frantz |
| 7,634,662 B2 | 12/2009 | Monroe |
| 7,825,829 B2 | 11/2010 | Madsen |
| 7,868,912 B2 | 1/2011 | Venetianer |
| 7,889,931 B2 | 2/2011 | Webb et al. |
| 7,920,626 B2 | 4/2011 | Fernandez |
| 8,068,154 B2 | 11/2011 | Jacob et al. |
| 8,117,090 B2 | 2/2012 | Romero |
| 8,243,140 B1 | 8/2012 | Howe |
| 8,408,772 B2 | 4/2013 | Li |
| 8,447,112 B2 | 5/2013 | Paul et al. |
| 8,531,523 B2 | 9/2013 | Anderson et al. |
| 8,666,801 B2 | 3/2014 | Cho |
| 8,693,733 B1 | 4/2014 | Harrison |
| 8,704,889 B2 | 4/2014 | Hofman |
| 8,736,678 B2 | 5/2014 | Miller, II |
| 8,742,908 B2 * | 6/2014 | Boudy ............... G08B 13/1427 340/568.1 |
| 8,774,465 B2 | 7/2014 | Christopulos et al. |
| 8,781,169 B2 | 7/2014 | Jackson et al. |
| 8,817,098 B2 | 8/2014 | Millar |
| 8,953,044 B2 | 2/2015 | Wu et al. |
| 8,983,137 B2 | 3/2015 | Hradetzky |
| 9,058,619 B2 | 6/2015 | Nandakumar et al. |
| 9,141,503 B1 | 9/2015 | Chen |
| 9,158,954 B2 | 10/2015 | Thuries et al. |
| 9,171,382 B2 | 10/2015 | Nerayoff et al. |
| 9,245,203 B2 | 1/2016 | Hofman et al. |
| 9,280,895 B2 | 3/2016 | Wang et al. |
| 9,327,685 B1 | 5/2016 | Wooten |
| 9,342,934 B2 | 5/2016 | Chen |
| 9,386,421 B2 | 7/2016 | Bolon et al. |
| 9,426,345 B1 | 8/2016 | Turner, Jr. et al. |
| 9,436,880 B2 | 9/2016 | Bos et al. |
| 9,471,838 B2 | 10/2016 | Miller et al. |
| 9,471,849 B2 | 10/2016 | Gurwicz |
| 9,477,917 B1 | 10/2016 | Koch |
| 9,491,420 B2 | 11/2016 | Mimar |
| 9,495,869 B2 | 11/2016 | Bhogal et al. |
| 9,497,393 B2 | 11/2016 | Reed et al. |
| 9,538,060 B1 | 1/2017 | Cilia |
| 9,542,609 B2 | 1/2017 | Wu et al. |
| 9,594,158 B2 | 3/2017 | Abl |
| 9,607,510 B1 | 3/2017 | DeLorean |
| 9,652,666 B2 | 5/2017 | Nerayoff et al. |
| 9,685,084 B2 | 6/2017 | Scholl et al. |
| 9,715,703 B2 | 7/2017 | Robinson et al. |
| 9,779,309 B1 | 10/2017 | Fink et al. |
| 9,796,331 B2 | 10/2017 | Karner et al. |
| 9,818,157 B2 | 11/2017 | McCall et al. |
| 9,846,883 B2 | 12/2017 | Angell et al. |
| 9,858,493 B2 | 1/2018 | Tseng |
| 9,911,297 B2 | 3/2018 | Lundy |
| 9,972,230 B1 | 5/2018 | DeLorean |
| 9,990,376 B2 | 6/2018 | Voeller et al. |
| 9,996,861 B2 | 6/2018 | Ryan et al. |
| 10,027,361 B2 | 7/2018 | Griffin |
| 10,032,212 B2 | 7/2018 | Winkelman et al. |
| 10,055,906 B1 | 8/2018 | Fournier et al. |
| 10,057,713 B1 | 8/2018 | Rackley, III et al. |
| 10,089,869 B1 | 10/2018 | Makled et al. |
| 10,121,172 B2 | 11/2018 | Hudson |
| 10,127,437 B2 | 11/2018 | Bhanu et al. |
| 10,140,488 B1 | 11/2018 | Bondarenko et al. |
| 10,152,858 B2 | 12/2018 | Boykin |
| 10,164,974 B2 | 12/2018 | Spencer et al. |
| 10,198,954 B2 | 2/2019 | Holtzman et al. |
| 10,217,034 B2 | 2/2019 | Hoshino |
| 10,223,609 B2 | 3/2019 | Bhanu |
| 10,373,226 B1 | 8/2019 | Russell |
| 10,417,816 B2 | 9/2019 | Satzoda et al. |
| 10,559,200 B1 | 2/2020 | Langley et al. |
| 10,562,540 B2 * | 2/2020 | Van Wiemeersch .. H04W 4/023 |
| 10,691,968 B2 | 6/2020 | Blais-Morin et al. |
| 10,872,524 B2 | 12/2020 | Kienitz et al. |
| 10,915,742 B2 | 2/2021 | Carey |
| 11,030,892 B1 | 6/2021 | Langley et al. |
| 11,080,533 B2 | 8/2021 | Camilus et al. |
| 11,243,959 B1 | 2/2022 | Gilboa |
| 11,941,716 B2 | 3/2024 | Child et al. |
| 2002/0089157 A1 | 7/2002 | Breed et al. |
| 2002/0186148 A1 | 12/2002 | Trajkovic et al. |
| 2003/0131011 A1 | 7/2003 | Haunschild et al. |
| 2004/0143602 A1 | 7/2004 | Ruiz et al. |
| 2004/0218052 A1 | 11/2004 | DiDomenico et al. |
| 2005/0012817 A1 | 1/2005 | Hampapur |
| 2005/0065711 A1 | 3/2005 | Dahlgren et al. |
| 2005/0140525 A1 | 6/2005 | Tomita et al. |
| 2005/0162515 A1 | 7/2005 | Venetianer et al. |
| 2006/0007308 A1 | 1/2006 | Ide |
| 2006/0028556 A1 | 2/2006 | Bunn et al. |
| 2006/0030985 A1 | 2/2006 | Lawida et al. |
| 2006/0106659 A1 | 5/2006 | Santos et al. |
| 2006/0109083 A1 | 5/2006 | Rathus et al. |
| 2006/0180647 A1 | 8/2006 | Hansen |
| 2006/0269105 A1 | 11/2006 | Langlinais |
| 2006/0278705 A1 | 12/2006 | Hedley et al. |
| 2007/0008129 A1 | 1/2007 | Soliman |
| 2007/0009136 A1 | 1/2007 | Pawlenko |
| 2007/0069921 A1 | 3/2007 | Sefton |
| 2007/0112620 A1 | 5/2007 | Johnson |
| 2007/0208492 A1 | 9/2007 | Downs et al. |
| 2007/0229307 A1 | 10/2007 | Pawlenko et al. |
| 2007/0291118 A1 | 12/2007 | Shu et al. |
| 2008/0045245 A1 | 2/2008 | Billmaier et al. |
| 2008/0117296 A1 | 5/2008 | Egnal et al. |
| 2008/0285803 A1 | 11/2008 | Madsen |
| 2009/0088924 A1 | 4/2009 | Coffee et al. |
| 2009/0161913 A1 | 6/2009 | Son |
| 2010/0066537 A1 | 3/2010 | Weller et al. |
| 2010/0088123 A1 | 4/2010 | McCall et al. |
| 2010/0195871 A1 | 8/2010 | Simon |
| 2010/0245582 A1 | 9/2010 | Harel |
| 2010/0283662 A1 | 11/2010 | Fox |
| 2011/0053559 A1 | 3/2011 | Klein |
| 2011/0134240 A1 | 6/2011 | Anderson et al. |
| 2011/0228085 A1 | 9/2011 | Hofman |
| 2011/0228253 A1 | 9/2011 | Batten et al. |
| 2011/0267222 A1 | 11/2011 | Craig |
| 2011/0313644 A1 | 12/2011 | Grassi |
| 2012/0106801 A1 | 5/2012 | Jackson |
| 2012/0140079 A1 | 6/2012 | Millar |
| 2012/0155712 A1 | 6/2012 | Paul et al. |
| 2013/0082828 A1 | 4/2013 | Furey et al. |
| 2013/0093886 A1 | 4/2013 | Rothschild |
| 2013/0129152 A1 | 5/2013 | Rodriguez Serrano et al. |
| 2013/0132166 A1 | 5/2013 | Wu et al. |
| 2013/0135468 A1 | 5/2013 | Kim |
| 2013/0282448 A1 | 10/2013 | Rydbeck et al. |
| 2013/0303189 A1 | 11/2013 | Bennett |

(56) References Cited

U.S. PATENT DOCUMENTS

| | | |
|---|---|---|
| 2013/0306728 A1 | 11/2013 | Thuries et al. |
| 2013/0308003 A1 | 11/2013 | Raghavan |
| 2013/0325629 A1 | 12/2013 | Harrison |
| 2014/0046800 A1 | 2/2014 | Chen |
| 2014/0066089 A1 | 3/2014 | Monks |
| 2014/0093125 A1 | 4/2014 | Hradetzky |
| 2014/0126779 A1 | 5/2014 | Duda |
| 2014/0139660 A1 | 5/2014 | Zhu |
| 2014/0159925 A1 | 6/2014 | Mimeault et al. |
| 2014/0160283 A1 | 6/2014 | Hofman et al. |
| 2014/0225719 A1 | 8/2014 | Kesavan et al. |
| 2014/0241585 A1 | 8/2014 | Zafiroglu |
| 2014/0254866 A1 | 9/2014 | Jankowski et al. |
| 2014/0254877 A1 | 9/2014 | Jankowski et al. |
| 2014/0254878 A1 | 9/2014 | Jankowski et al. |
| 2014/0328512 A1 | 11/2014 | Gurwicz |
| 2014/0334684 A1 | 11/2014 | Strimling |
| 2015/0049914 A1 | 2/2015 | Alves |
| 2015/0054639 A1 | 2/2015 | Rosen |
| 2015/0054676 A1 | 2/2015 | Vinski et al. |
| 2015/0113012 A1 | 4/2015 | Silver |
| 2015/0119069 A1 | 4/2015 | Harris et al. |
| 2015/0123794 A1 | 5/2015 | Hamalainen et al. |
| 2015/0138001 A1 | 5/2015 | Davies |
| 2015/0138332 A1 | 5/2015 | Cheng et al. |
| 2015/0149465 A1 | 5/2015 | Unser et al. |
| 2015/0154669 A1 | 6/2015 | Wu et al. |
| 2015/0205868 A1 | 7/2015 | Boncyk et al. |
| 2015/0294373 A1 | 10/2015 | Schuh |
| 2015/0310293 A1 | 10/2015 | Dehart |
| 2015/0317687 A1 | 11/2015 | Ramesh et al. |
| 2015/0348342 A1 | 12/2015 | Baxley et al. |
| 2015/0356498 A1 | 12/2015 | Casanova |
| 2015/0381946 A1 | 12/2015 | Renkis |
| 2015/0381948 A1 | 12/2015 | Renkis |
| 2016/0021344 A1 | 1/2016 | Renkis |
| 2016/0098864 A1 | 4/2016 | Nawrocki |
| 2016/0110759 A1 | 4/2016 | Polehn et al. |
| 2016/0112461 A1 | 4/2016 | Othmer |
| 2016/0124071 A1 | 5/2016 | Baxley et al. |
| 2016/0127931 A1 | 5/2016 | Baxley |
| 2016/0266579 A1 | 9/2016 | Chen |
| 2016/0343252 A1 | 11/2016 | Davies et al. |
| 2016/0344979 A1 | 11/2016 | Renkis |
| 2016/0360181 A1 | 12/2016 | Drako |
| 2017/0018170 A1 | 1/2017 | Sayavong et al. |
| 2017/0032666 A1 | 2/2017 | Pretorius et al. |
| 2017/0048376 A1 | 2/2017 | Logan |
| 2017/0053171 A1 | 2/2017 | Buehler |
| 2017/0061506 A1 | 3/2017 | Dow et al. |
| 2017/0124395 A1 | 5/2017 | Cohen et al. |
| 2017/0126648 A1 | 5/2017 | Bond et al. |
| 2017/0131202 A1 | 5/2017 | McClintock et al. |
| 2017/0140237 A1 | 5/2017 | Voeller et al. |
| 2017/0186317 A1 | 6/2017 | Franklin et al. |
| 2017/0193810 A1 | 7/2017 | Cao et al. |
| 2017/0202185 A1* | 7/2017 | Trumbull ............ A61B 5/02055 |
| 2017/0206559 A1 | 7/2017 | Bakshi et al. |
| 2017/0300758 A1 | 10/2017 | Renkis |
| 2017/0308964 A1 | 10/2017 | Morris et al. |
| 2017/0330455 A1 | 11/2017 | Kikuchi et al. |
| 2017/0339529 A1 | 11/2017 | Buttolo et al. |
| 2017/0357662 A1 | 12/2017 | Knany et al. |
| 2017/0357881 A1 | 12/2017 | Hoshino |
| 2017/0365105 A1 | 12/2017 | Rao et al. |
| 2017/0372143 A1 | 12/2017 | Barcus et al. |
| 2017/0374324 A1 | 12/2017 | Loftus |
| 2018/0032590 A1 | 2/2018 | Recavarren |
| 2018/0072177 A1 | 3/2018 | Tremblay |
| 2018/0096595 A1 | 4/2018 | Janzen et al. |
| 2018/0103348 A1 | 4/2018 | Malone |
| 2018/0107528 A1 | 4/2018 | Vizer et al. |
| 2018/0107892 A1 | 4/2018 | Istenes |
| 2018/0137356 A1 | 5/2018 | Nerayoff et al. |
| 2018/0144382 A1 | 5/2018 | Makke et al. |
| 2018/0165935 A1 | 6/2018 | VanBlon et al. |
| 2018/0174457 A1 | 6/2018 | Taylor |
| 2018/0197416 A1 | 7/2018 | Hyde et al. |
| 2018/0211115 A1 | 7/2018 | Klein |
| 2018/0211116 A1 | 7/2018 | Modi et al. |
| 2018/0211117 A1 | 7/2018 | Ratti |
| 2018/0247519 A1 | 8/2018 | Bekanich |
| 2018/0253805 A1 | 9/2018 | Kelly et al. |
| 2018/0300578 A1 | 10/2018 | Wilbert et al. |
| 2018/0328757 A1 | 11/2018 | Chan et al. |
| 2018/0349699 A1 | 12/2018 | O'Connell et al. |
| 2018/0350230 A1 | 12/2018 | Kienitz et al. |
| 2018/0357247 A1 | 12/2018 | Siminoff et al. |
| 2019/0031146 A1 | 1/2019 | Etonye |
| 2019/0039463 A1 | 2/2019 | Moghe et al. |
| 2019/0043355 A1 | 2/2019 | Ferguson et al. |
| 2019/0050634 A1 | 2/2019 | Nerayoff et al. |
| 2019/0050652 A1 | 2/2019 | Baker et al. |
| 2019/0051142 A1 | 2/2019 | Wiles |
| 2019/0057601 A1 | 2/2019 | Watanabe et al. |
| 2019/0087864 A1 | 3/2019 | Hacker |
| 2019/0147260 A1 | 5/2019 | May |
| 2019/0147306 A1 | 5/2019 | Hoshino |
| 2019/0163982 A1 | 5/2019 | Block |
| 2019/0244498 A1 | 8/2019 | Dumas |
| 2019/0294890 A1 | 9/2019 | Kanga |
| 2019/0311327 A1 | 10/2019 | Habbaba et al. |
| 2019/0325230 A1 | 10/2019 | Nadler |
| 2019/0329421 A1 | 10/2019 | Deyle et al. |
| 2020/0097735 A1 | 3/2020 | Altuev |
| 2020/0104566 A1 | 4/2020 | Yamada et al. |
| 2020/0111350 A1 | 4/2020 | Julian et al. |
| 2020/0120266 A1 | 4/2020 | Kleinbeck |
| 2020/0126407 A1 | 4/2020 | Sakito et al. |
| 2020/0162701 A1 | 5/2020 | Nixon et al. |
| 2020/0211345 A1 | 7/2020 | Gordon-Carroll et al. |
| 2020/0265258 A1 | 8/2020 | Blais-Morin et al. |
| 2020/0320573 A1 | 10/2020 | Harrison |
| 2020/0410251 A1 | 12/2020 | Petrey, Jr. |
| 2021/0019645 A1 | 1/2021 | Petrey, Jr. |
| 2021/0026019 A1 | 1/2021 | Gahagan et al. |
| 2021/0044959 A1 | 2/2021 | Beaurepaire |
| 2021/0192943 A1 | 6/2021 | Neff |
| 2021/0225161 A1 | 7/2021 | Horn |
| 2021/0326563 A1 | 10/2021 | Kossor |
| 2021/0334549 A1 | 10/2021 | Ekkel |
| 2021/0398298 A1 | 12/2021 | Kisara |
| 2022/0100999 A1 | 3/2022 | Hill et al. |
| 2022/0141426 A1 | 5/2022 | Kim et al. |
| 2022/0148320 A1 | 5/2022 | Alakarhu |
| 2022/0188953 A1 | 6/2022 | Child et al. |
| 2022/0294946 A1 | 9/2022 | D'Annunzio |
| 2023/0010292 A1 | 1/2023 | Simon |
| 2023/0046309 A1 | 2/2023 | May |
| 2023/0070108 A1 | 3/2023 | Child |
| 2023/0073717 A1* | 3/2023 | Child ............... G06F 16/9537 |
| 2023/0073876 A1 | 3/2023 | Child |
| 2023/0110148 A1* | 4/2023 | Davis ............... G06K 19/0723 |
| | | 705/333 |
| 2023/0162310 A1 | 5/2023 | Child et al. |
| 2023/0177954 A1 | 6/2023 | Neff et al. |
| 2023/0196780 A1* | 6/2023 | Nieuwkerk ......... G08B 29/188 |
| | | 382/103 |
| 2023/0237907 A1 | 7/2023 | Valcarcel et al. |
| 2024/0021092 A1 | 1/2024 | Child |
| 2024/0185371 A1 | 6/2024 | Child et al. |
| 2025/0157327 A1 | 5/2025 | Child |

FOREIGN PATENT DOCUMENTS

| | | | |
|---|---|---|---|
| CA | | 2916418 A1 | 6/2017 |
| CA | | 3000127 A1 | 6/2018 |
| CA | | 2924997 C | 6/2021 |
| CA | | 2979406 C | 2/2024 |
| CN | | 102708693 A | 10/2012 |
| CN | | 203050715 U | 7/2013 |
| DE | | 102005035242 A1 | 2/2007 |
| EP | | 0784838 B1 | 6/2000 |
| EP | | 1993279 A2 | 11/2008 |

(56) References Cited

FOREIGN PATENT DOCUMENTS

| | | |
|---|---|---|
| EP | 3726253 A1 | 10/2020 |
| EP | 3989194 A1 | 4/2022 |
| FR | 2975210 A3 | 11/2012 |
| GB | 2328731 A | 3/1999 |
| IN | 282920 B | 5/2017 |
| SG | 140858 A1 | 4/2008 |
| TW | 201935419 A | 9/2019 |
| WO | WO2004/027730 A1 | 4/2004 |
| WO | WO2007/032025 A2 | 3/2007 |
| WO | WO2008/088880 A1 | 7/2008 |
| WO | WO2011/023024 A1 | 3/2011 |
| WO | WO2012/038964 A2 | 3/2012 |
| WO | WO2014/152923 A1 | 9/2014 |
| WO | WO2015/193903 A2 | 12/2015 |
| WO | WO2017/180900 A1 | 10/2017 |
| WO | WO2018/009567 A1 | 1/2018 |
| WO | WO2019/043444 A1 | 3/2019 |
| WO | WO2019/043446 A1 | 3/2019 |
| WO | WO2019/099149 A1 | 5/2019 |
| WO | WO2019/162970 A1 | 8/2019 |
| WO | WO2020/145882 A1 | 7/2020 |

OTHER PUBLICATIONS

Foresti, Gian Luca et al. "Visual Sensor Technology for Advanced Surveillance Systems: Historical View, Technological Aspects and Research Activities in Italy", Department of Mathematics and Computer Science University of Udine, via delle Scienze, 206, 33100 Udine, Italy, Sensors ISSN 1424-8220; 19 Pages (2252-2270); Year 2009.

Makarov, A., et al.; Authenticating Vehicles and Drivers in Motion Based on Computer Vision and RFID Tags; 2012 IEEE 10th Jubilee International Symposium on Intelligent Systems and Informatics; IEEE 2012; Year 2012.

Hu, Weiming, et al.; "A Survey on Visual Surveillance of Object Motion and Behaviors"; IEEE Transactions on Systems, Man, and Cybernetics, Part C: Applications and Reviews, vol. 34, No. 3, Aug. 2004; pp. 334-352; Year 2004.

Yaacoub, et al.; Security analysis of drones systems: Attacks, limitations,recommendations; Internet of Things 11 (2020) 100218; Elsevier;Retrieved on Apr. 17, 2023 (Apr. 4, 2023) from https://www.ncbi.nlm.nih.gov/pmc/articles/PMC7206421/.

Notification and International Search Report and Written Opinion; related to Application No. PCT/US23/13274 dated May 19, 2023.

Panganiban, Edward B. et al.; "RFID-Based Vehicle Monitoring System"; 2017 IEEE 9th International Conference on Humanoid, Nanotechnology, Information Technology, Communication and Control, Environmental Management (HNICEM); IEEE, Dec. 1-3, 2017; pp. 1-6; Year 2017.

Howington, Larry C.; Automated License Plate Reading; Development and use of Perceptics multi-purpose License Plate Reader Technology; Sep. 1989.

Waters, Rebecca; Automated License Plate Recognition: An Insider's Look; P&SN Police and Security News 2022; Posted by Publisher—Sep. 15, 2017.

Ceng, M. Smalley et al.; Videqual—A tool for quantitive meansurement of fixed. CCTV Surveillance Systems; Presented and Published at the International Carnahan Conference on Security Technology 1996; 0-7803-3537-6-9/06; 1996 IEEE.

Kanayama, Kenji et al.; Development of Vehicle-License Number Recognition System Using Real-Time Image Processing and Its Application to Travel-Time Measurement; CH2944-7/91/0000/0798; 1991 IEEE.

Kwasnicka, Halina and Wawrzyniak, Bartosz; License Plate Localization and Recognition in Camera Pictures; AI-METH 2002—Artificial Intelligence Methods; Gliwice, Poland, Nov. 13-15, 2002.

Appian Technology PLC; Talon—Description and Technical Specification—Automatic Number Plate Recognition System; Copyright 2003.

Valera, M. and Velastin, S.A., "Intelligent distributed surveillance systems: a review", Source: vol. 152, Issue 2, Apr. 2005, p. 192-204, DOI: 10. 1049/ip-vis:20041147, Print ISSN 1350-245X, Online ISSN 1359-7108; 13 pages; 2005.

Hampapur, A.; "smart video surveillance: exploring the concept of multiscale spatiotemporal tracking", Published in: IEEE Signal Processing Magazine (vol. 22, Issue: 2, Mar. 2005), pp. 38-51; 2005.

Girgensohn, Andreas, "DOTS: Support for Effective Video Surveillance", MM '07: Proceedings of the 15th ACM International conference on Multimedia Sep. 2007; pp. 423-432; 2007.

Abwnawar, N. et al.; Towards Location-Aware Access Control and Data Privacy in Inter-Cloud Communications; IEEE Eurocon 2017, Jul. 6-8, 2017, Ohrid, R. Macedonia; pp. 739-744; Retrieved from the Internet by the European Patent Office and downloaded; UTC from IEEE Xplore, https://ieeexplore.ieee.org on Apr. 18, 2025.

Domingo, Jaime Duque et al.; *Integration of Computer Vision and Wireless Networks to Provide Indoor Positioning*; Sensors MDPI (Bazel, Switzerland); Dec. 12, 2019, 19, 5495; doi: 10.3390/s19245495; www.mdpi.com/journal/sensors; pp. 1-17; 2019.

Zhu, Dali et al.; *Fusion of Wireless Signal and Computer Vision for Identification and Tracking*; 2021 28th International Conference on Telecommunications (ICT); 7 total pages; 2021.

Guo, Yan et al.; *RFIDCam: a RFID-Aided Visual Tracking System*; The 2018 International Conference on Control Automation & Information Sciences (ICCAIS 2018) Oct. 24-27, 2018, Hangzhou, China; pp. 297-302; 2018.

Grzechca, Damian et al.; *Indoor location and idetification of objects with video surveillance system and WiFi module*;2014 International Conference on Mathematics and Computers in Sciences and in Industry; DOI 10.1109/MSCI.2014.52; pp. 171-174; 2014.

Liu, Hansi et al.; *Vi-Fi: Associating Moving Subjects across Vision and Wireless Sensors*; 2022 21st ACM/IEEE International Conference on Information Processing in Sensor Networks(IPSN); IPSN 22, May 4-6, Milan, Italy; DOI 10.1109/IPSN54338.2022.00024; pp. 208-219; 2022.

\* cited by examiner

| PRIMARY | TOTAL OCCURRENCES ↓ |
|---|---|
| HPFD ENG 9--00:30:44:23:FE:BF | 10181 |
| GRAND TOTAL | 10181 |

*PRIMARY CONVOY SEARCH FOCUS SIGNAL*

| CONVOY | TOTAL OCCURRENCES ↓ |
|---|---|
| HPFD ENG 9--00:30:44:23:FE:C0 | 792 |
| 10:B1:0E:9E:C8:10 | 548 |
| 18:99:E7:AE:E5:63 | 382 |
| GRAND TOTAL | 10181 |

ANALYZE

DRAG A COLUMN HEADER AND DROP IT HERE TO GROUP BY THAT COLUMN

| CONVOY | MAKE | MODEL | COLOR | MMC PLATE | PRIMARY | OCCURRENCES ↓ | DISTINCT SITES |
|---|---|---|---|---|---|---|---|
| HPFD ENG 9--00:30:44:2... | | | | | HPFD ENG 9--00:30:44:2... | 792 | 2 |
| 10:B1:0E:9E:... | MICROSOFT | BT_MODEL_UNK... | | ⊙ | HPFD ENG 9--00:30:44:2... | 548 | 1 |
| 18:99:E7:AE:E... | MICROSOFT | BT_MODEL_UNK... | | ⊙ | HPFD ENG 9--00:30:44:2... | 382 | 1 |
| 00:13:43:74:... | MICROSOFT | | | ⊙ | HPFD ENG 9--00:30:44:2... | 375 | 1 |
| 22:56:13:10:... | MICROSOFT | BT_MODEL_UNK... | | ⊙ | HPFD ENG 9--00:30:44:2... | 357 | 1 |
| 5D:AF:44:24:... | APPLE | BT_MODEL_UNK... | | ⊙ | HPFD ENG 9--00:30:44:2... | 338 | 1 |

*RESULTING TARGETS IN CONVOY WITH PRIMARY*

FIG. 4D

SYSTEMS AND METHODS FOR ELECTRONIC SURVEILLANCE

CROSS-REFERENCE

The present Patent Application claims benefit of U.S. Provisional Patent Application No. 63/313,859, filed Feb. 25, 2022, titled "SYSTEMS AND METHODS FOR ELECTRONIC SURVEILLANCE".

INCORPORATION BY REFERENCE

The disclosure and figures of U.S. Provisional Patent Application No. 63/313,859, filed Feb. 25, 2022, are specifically incorporated by reference herein as if set forth in its entirety.

TECHNICAL FIELD

In one aspect, the present disclosure is directed to surveillance systems and methods, and more specifically, to surveillance systems and methods that facilitate collection and correlation of electronic signatures and/or visual identifiers for targets or convoys captured by a mobile collection system. Other aspects also are described.

BACKGROUND

A large number of homes and businesses and other private and public spaces now include many devices that utilize Wi-Fi signals, Bluetooth signals, RFID signals, and/or other suitable wireless signals. Further, use of home security cameras and/or doorbell cameras has become more common among large portions of the population. While cameras in public and private spaces can capture images and/or video, the cameras cannot identify people who are obscured, masked, or otherwise attempt to hide their identity. Notably, most people carry at least one electronic device regularly, e.g., a smartphone.

It can be seen that a need exists for surveillance systems and methods that can be used to provide a correlation between devices, images, and/or locations over a wide area or region, thus enabling tracking of objects, unidentified persons, etc. in a selected area.

The present disclosure is directed to the foregoing and other related, and unrelated, problems in the relevant art.

SUMMARY

Briefly described, the present disclosure is directed to surveillance systems and methods for collecting electronic signatures and/or images, for identification of targets, such as unidentified persons or vehicles within a prescribed or selected location or area and/or for tracking of packages (e.g., high value packages). Further, electronic signatures and/or images may be correlated thus enabling monitoring and potential identification of unidentified persons or vehicles and/or facilitating detection of package delivery exceptions.

According to aspects of the present disclosure, the surveillance system is configured to utilize existing movement of vehicles (e.g., delivery vehicles, patrol vehicles, etc.) by placing collection devices, including a plurality of sensors, detectors or other, similar devices, on such vehicles. Each of the collection devices will be configured to collect electronic signals as the respective vehicles move along streets and approach homes, businesses, and other locations within a selected area (e.g., for deliveries, etc.) for the purpose of correlating those signals with other collected electronic signals or signature information and developed signal/signature patterns to identify a target or targets that may have been present and/or for tracking objects, such as packages. In addition, the collected electronic signals can be compared with, e.g. developed or stored signal patterns and/or previously identified or vetted electronic device signals to look for anomalies such as unknown electronic devices present at a location where a criminal or other event has occurred.

In embodiments, the collection devices each may be an independent device, or can be linked to other collection devices in a network or an array, and further may be integrated into existing systems, such as a logistics system for a delivery service or other suitable systems. The surveillance system can be configured to cooperate with other collection systems, such as stationary collection systems installed in homes, businesses, and other locations and configured to utilize existing Wi-Fi connectivity of those locations. Such systems can include home automation, convenience or other electronic devices. Examples include integration with video doorbell systems; video surveillance systems; alarm components; mailbox sensors; exterior lighting and/or motion detection systems; garage, door and gate activation pads or openers, neighborhood watch systems, etc.

In some embodiments, collected electronic signal data obtained by the collection devices may be stored and/or filtered on the vehicle and uploaded to a central system when the vehicle returns to its base and/or may be sent wirelessly (e.g., via cellular and/or satellite data networks) to a central database system for storage and correlation processing. In embodiments, the database and/or resulting correlation information could be made available to law enforcement for processing. The collected data generally will be individually anonymous, e.g. unlike a video or photograph of a person, etc., the collected data is directed to features of the captured electronic signals from electronic devices with 'rolling' identifiers that are intended to be variable. The surveillance system will include programming, including models configured for cluster and pattern analysis, which, in embodiments of the present disclosure, provide a central capability to identify certain electronic devices and targets (e.g. vehicles, individual electronic devices, etc.). Signals and signal characteristics can be used individually or in combination with adjacent signals and/or other collected data to uniquely identify a source for correlation with and identification of targets. For example, the collected electronic signal information could be provided to law enforcement for comparison with automated license plate data collected at or near a location such as to aid in criminal investigations.

Such surveillance systems and methods may include one or more collection devices mounted on one or more vehicles and/or installed at one or more selected locations. Each of the one or more collection devices may include one or more antennas configured to detect and receive electronic signals from electronic devices using a corresponding frequency. In embodiments, each of the one or more collection devices also may include communications circuitry for transmitting collected electronic signals to an intelligence device that may include communications circuitry to receive any detected electronic signals and/or other data (e.g., images, a series of images, video, location data, license plate numbers, and/or other data related to potential targets). The intelligence device will be configured and/or will include programming configured to analyze the received data. For example, the data from the collection devices can be analyzed to compare data for respective locations recorded at different times and segmented into likely fixed and mobile sources to facilitate identification of vehicles and individuals regularly in the area. In some embodiments, the collected data can be filtered such that regular or known sources are not stored to increase privacy, while new sources or investigation targets are stored, such as to facilitate a variety of implementations from general data collection to precisely focused investigative storage in order to maximize investigative value and/or maximize residential privacy, respectively.

The electronic signals included within the received data may include tags identifying a type of electronic device that the signal originated from, as well as a number of times and a length of time that the signal is located within a particular area or within multiple areas. The tags may also indicate whether signal is not typically located in that particular area. The intelligence device can correlate unidentified and/or atypical electronic signals and/or other data with electronic signals typically found in respective areas. The intelligence device may then determine whether the unidentified and/or atypical electronic signals and/or other data is correlated with a particular target, convoy, or person based on data from other locations or areas. In addition, or alternatively, the unidentified and/or atypical electronic signals can be stored for potential future correlation (e.g., to a crime that is reported later and that occurred in the vicinity of the unidentified and/or atypical electronic signals). Thus, a target, convoy, and/or person(s)/electronic devices can be tracked and/or associated with events in selected areas or locations.

According to aspects of the present disclosure, an at least partially mobile surveillance system is provided, which includes collection systems, devices, and/or assemblies, and an intelligence system having classification and search capabilities. In embodiments, the surveillance system will use the characteristics of the collected identifying characteristics to prioritize or otherwise indicate to an investigator that a particular characteristic is material to the identification of the target of an investigation in a particular area or location (e.g., a home, a neighborhood, and/or a business).

In embodiments, a method is provided that can record electronic signal telemetry while moving through a selected region or area and that can use correlation statistics and analysis to develop relationships between identifiers and non-unique characteristics over a single encounter (e.g., an atypical electronic device located in a selected area during a particular event) or multiple encounters in one or more locations. No single factor may be an absolute or unique identifier. One or more combinations of non-unique characteristics and broadcast or visible variables, methods and transmitted values can be used to identify a set that are collectively statistically significant in their unique association with the source area or location. In embodiments, this method may use artificial intelligence and "Big Data" techniques to identify correlations and to rank those results based on statistical methods created in expert noise reduction and confidence analysis.

In embodiments, the at least partially mobile surveillance system can include a plurality of collection systems, devices, and/or assemblies that are mounted on vehicles that move through one or more selected geographic and/or strategic areas. By placing a collection of antennae and computer equipment in a delivery vehicle, the package could filter, collect, and stage significant amounts of electronic signal data, integrated with a GPS located on the vehicle. For example, the collection system can be configured to gather signal location, strength, source type, frequency, and data payload information. Since the vehicle is frequently moving through the selected region, the collection system can facilitate triangulation of source location for further refining a signal source location as well. The information could be stored in a raw form and not processed for correlation or refined on location to protect privacy until an authorized, auditable inquiry triggered offload and/or based on a periodic or other triggering event to cause the data to be sent to a central processing location or other system for processing of the data independently or along with other collected source data. By collecting the data centrally, law enforcement personnel can analyze data from multiple crime scenes, known target locations, vehicle accident scenes, emergency incidents, sensitive locations etc.

In embodiments, the collection systems generally are configured to capture or facilitate collection of information related to visual identifiers and/or electronic signatures associated with and/or atypical to the selected areas/locations as the collection systems are moved through the selected area or areas. For example, the collection devices can include purpose-built collection hardware, additional antennae, and radio hardware that can be integrated into vehicles that often travel through portions of the selected areas to allow collection of electronic signal data that can be time and location correlated across the collection as the vehicle moves through selected areas. In some embodiments, the surveillance system also can include stationary collection systems, devices, and/or assemblies that are located at selected geographic areas or strategic locations. Placing sensors in locations where people are already aware of and/or are comfortable with cameras and surveillance would allow sensing and recording of approach and location access.

In embodiments, the collection systems can include at least one sensor configured to collect or otherwise capture electronic signal information related electronic signatures of targets and/or electronic devices. This information further can include visual identifiers such as license plate information or other visual or imaged information associated with vehicles (e.g., stickers, patterns, position(s) of component parts, after-market added parts, damage, and/or various other markings, etc . . . ) that can be used to distinguish or otherwise identify, detect or discern a target vehicle; and/or images or a series of images, such as photographs or video captured by security cameras and/or doorbell cameras. The electronic signatures can include an electronic signal or combination(s) of electronic signals emanating from transmitting electronic devices, and which are associated with and/or can uniquely identify the targets in or moving about the selected areas/locations, such as cell phones, laptops, computing devices, garage door openers, home automation devices, security panels, security cameras, doorbell cameras, key fobs for a vehicle, and/or other electronic devices emitting a wireless signal. The data collected from any of the devices may be tagged. The tags may include the type of device and whether the device is typical or atypical to the selected locations.

In addition, in some aspects, the surveillance system can include an intelligence device or system that is in communication with the plurality of collection systems, and will be configured to receive the information collected or captured by the collection systems or devices (e.g., data points or packets of location, time, and date stamped information in real time for targets and/or devices within proximity of the collection point systems), and will further be configured (e.g. including programming, etc.) to identify and/or track the atypical targets and/or electronic devices based on this received information. In embodiments, the intelligence system can include classification and search capabilities, for example, including one or more classification and search engines and an intelligence database in communication therewith. The one or more classification and search engines can be configured to identify or extract the electronic signatures associated with the targets using the information collected by the collection systems and catalogue them in the intelligence database with a number of occurrences or discoveries and/or certain identifying characteristics (e.g., geographical coordinates, time stamps, source manufacturer, source type and unique ID, etc.) allowing these identified electronic signatures to become unique, identifiable, individually searchable, and/or searchable in combination with other electronic signatures or targets (e.g., such as in a convoy search).

The surveillance system thus is configurable to track, map, catalogue, etc., movements of atypical targets (e.g., atypical to a selected area or location) in real time or historically as electronic signals are collected by one or more mobile and/or stationary collection systems or devices in one or more selected areas or locations. The tracking information generated can be used create a map of typical and/or expected electronic signals at multiple locations in one or more selected areas, to help confirm and/or authenticate potential target identification, and further can be configured to generate alerts or notifications when certain targets or atypical targets are recorded by one or more of the mobile and/or stationary collection systems in proximity to one or more locations during an event or during a selected time period including the event.

The one or more classification and search engines can develop inferences of relationships between electronic devices and targets typical to an area or location and electronic devices and targets atypical to an area based on consistency and/or frequency of detected correlations between identified/extracted electronic signatures and/or targets. Further, the one or more classification and search engines can base such relationships on a reported event or alert, such as a crime or other events.

For example, the one or more classification and search engines can use frequency and consistency of electronic signals to determine the relative certainty of association of the transmitted electronic devices and targets to develop electronic signatures of the targets. That is, if the relative certainty or probability that a certain electronic signal or combination of electronic signals are associated with a target meets a prescribed threshold, the one or more classification and search engines can identify an electronic signal or combinations of electronic signals as a specific electronic signature associated with that target. Further, the one or more classification and search engines can use frequency and consistency of captured images of different targets traveling together to develop a correlation between different targets. That is, if the relative certainty or probability that a certain first target travels with a second target meets a prescribed threshold, the one or more classification and search engines can identify one or more targets, e.g. first and second targets and/or others, as associated with a convoy. The term "convoy" generally refers to a group of or two or more targets that travel together one or more times on one or more days (e.g., two vehicles that travel together at a specific time on various days). In such embodiments, a convoy may be generated based on electronic signals and/or targets usually found in a selected area. Different or atypical electronic signals and/or targets may be distinguished based on exclusion in existing convoys.

In an embodiment, the one or more classification and search engines will be configured to correlate one or more identifying characteristics and/or non-unique characteristics over a single encounter or multiple encounters. The one or more identifying characteristics may include license plates, electronic signals, images, a series of images, and/or visual idiosyncrasies, among other factors. Non-unique characteristics may include vehicle make, vehicle model, vehicle color, vehicle year, articles of clothing, among other non-unique characteristics and/or personal characteristics. Such correlations may be determined via machine learning models or classifiers and/or statistical modeling or analysis. The one or more classification and search engines may utilize such correlations to determine various aspects of a target, such as a potential association or correlation between a target and an event in a selected location, among other aspects. Further, the one or more classification and search engines may be utilized to determine statistically significant correlations or associations between atypical targets or atypical electronic signals and/or electronic signals.

In an embodiment, the one or more classification and search engines will be configured to analyze correlation results using frequency of occurrence, relative representation, signal type, signal receipt location diversity, and signal strength profiling to generate and present confidence levels and/or rankings for correlations between signal-receipt events. The one or more classification and search engines may be configured to filter and sort results such that the user is directed to signals to be associated with a particular event or alarm.

In an embodiment, the systems and methods may include filtering in-coming electronic signals to maximize the receipt and storage of moving, stable, identifiable signals by analyzing the signal value, strength, spectrum, and embedded identification data. The systems and method may also simultaneously reduce and filter signals and identifiers that are 'noise' from likely-unrelated sources and not relevant to the future correlation.

In addition, or in the alternative, the one or more classification and search engines will be configured to associate or correlate identifying atypical electronic signatures with visual identifiers and frequent electronic signatures at a selected location, such as a visual vehicle identifier, to allow independent identification, tracking, and location identification of targets based on the associated identifying electronic signatures. That is, once the system has records correlating electronic signatures associated with a specific visual vehicle identifier, e.g., a specific license plate number, the intelligence system will be able to detect the likely presence of a vehicle and its associated license plate without visual information, e.g., without the use of a camera. Further, correlation between two or more targets may allow dependent tracking and location identification of targets based on association or correlation with one or more targets. That is, once the system has records correlating a first target with a second target (or more targets), the intelligence system will be able to determine likely presence of the first target based on visual information and/or electronic signals of the second or more targets.

Furthermore, the collection systems can be mounted on vehicles that move through areas that include homes, neighborhoods, businesses, and/or other locations, such that the intelligence system will be able to identify, and catalogue known electronic signatures and targets in selected areas, e.g., for tracking, mapping, etc. of persons or electronic devices atypical or different than that of persons or electronic devices usually found in the selected areas.

In embodiments, the at least one sensor of each collection system can include a plurality of sensor assemblies. The sensor assemblies can include one or more cameras or camera systems configured to capture or facilitate collection of information related to vehicle identifiers, such as visual information related to a license plate of a vehicle or other visual vehicle identifiers.

In addition, the sensor assemblies can include one or more antennas or other signal receivers configured to capture information related to the electronic signatures. The one or more antennas can include a plurality of antennas, such as a Bluetooth® antenna, a Wi-Fi antenna, a RFID antenna, or other RF antennas or combinations thereof, configured to capture information related to electronic signals associated with the targets.

In some embodiments, the collection systems can be used in conjunction with or include Automated License Plate Readers ("ALPR") in certain areas, allowing the intelligence system to develop a subset of electronic signals, i.e., an electronic signature, associated with a license plate read at a moment in time and location. Electronic data points from less expensive collectors can then be used to provide more precise tracking than ALPR alone.

In some embodiments, the surveillance system can be configured to capture sample electronic signature information from a target and/or visual identifiers of other targets, associate that information with the target's identification, and then search for or alert on receipts of similar electronic signature information at one of the collection point systems.

In additional embodiments, the surveillance system can be configured to allow for search inquiries or scans of suspect's electronic signatures to search selected locations in the database history, placing the suspect at those locations and at a particular time or times. In such examples, the surveillance system can include a user interface. A user can access the user interface and provide various inputs into the user interface. The inputs may include one or more of time, location, license plate numbers, partial license plate numbers, convoys, and/or data related to an event (e.g., package delivery, crime, new visitor, etc.). In such examples, the surveillance system may include text recognition algorithms to parse through text corresponding to the event and separate out important or key words, such as identifying characteristics. Upon providing the various inputs, the surveillance system may provide, as an output, information correlated to the various inputs. For example, an input may include a time, a location, and a portion of a license plate. The output may include how often a vehicle with the portion of the license plate is at that location. Such an output may be determined, at least in part, based on the correlation between that vehicle and other vehicles, electronic data signals, and/or people.

In still other embodiments, the surveillance system can be configured to allow for labeling of specific electronic signatures with a target and then alert or search for history of those specific electronic signatures in the database, placing the target at various locations.

In further embodiments, the surveillance system further can indicate or determine changes in association or travel of suspects or other individuals of interest based on variations in electronic signatures and/or correlated targets associated with a target or targets.

In further embodiments, the surveillance system further can be utilized to generate mail and package delivery notifications (e.g., including package theft), transient signal schedule tracking, regular transient signal reporting to improve bus or transport arrival or departure predictability and alerts, intrusion detection, tagged pet tracking, integrated known-visitor security and lock status-change activation, occupancy trend tracking and reporting for integrated utility and energy management, customization of entertainment and lighting systems by occupancy, simplified guest arrival and security management for commercial space rentals, hotel and campus security systems, and/or integrated video surveillance retrieval and queueing systems, etc.

In further embodiments, the system can cooperate with a delivery services systems to track packages, such as high-value packages, and alert personnel to potential thefts and/or deliveries to incorrect locations. For example, if a target package is recorded in the courier's system as being on a delivery vehicle or is otherwise expected to be on the vehicle (e.g., before it is scheduled to be delivered) and the surveillance system does not detect the package on the vehicle and/or detects the package at a location that is sufficiently far from the vehicle (e.g., the package is out of range of an RFID reader on the delivery vehicle and/or an RFID signal associated with the package is detected by a collection system on another vehicle at another location), the system can generate an alert that the package may have been misdelivered or stolen off the vehicle and provide surveillance data (e.g., electronic signatures, images, etc. near the vehicle) over a relevant time period (e.g., a time period including when the package was last detected on the vehicle and the time of the alert). This data may be used to track the target package and/or those who may be with the target package (e.g., if the system detects signals associated with one or more devices, such as mobile phones, along with the target package in one or more locations). In another example, a target package may be detected at an unexpected location or area after it has been recorded as properly delivered, in which case, the system can record the unexpected location with associated time and surveillance data in case the package is reported stolen or misdelivered and/or generate an appropriate alert.

Accordingly, embodiments of at least partially mobile surveillance systems and methods, including systems and methods for facilitating collection and correlation of electronic signatures and/or visual identifiers for targets or convoys that are directed to the above discussed and other needs are disclosed. The foregoing and other advantages and aspects of the embodiments of the present disclosure will become apparent and more readily appreciated from the following detailed description, taken in conjunction with the accompanying drawings. Moreover, it is to be understood that both the foregoing summary of the disclosure and the following detailed description are exemplary and intended to provide further explanation without limiting the scope of the present disclosure.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIGS. 4A through 4G show exemplary screen shots of an interface associated with the surveillance system according to FIG. 1, FIG. 2, FIG. 3A, FIG. 3B, and/or FIG. 3C.

The use of the same reference symbols in different drawings indicates similar or identical items.

DETAILED DESCRIPTION

The following description in combination with the Figures is provided to assist in understanding the teachings disclosed herein. No attempt is made to show structural details of this disclosure in more detail than may be necessary for a fundamental understanding of the exemplary embodiments discussed herein and various embodiments in which they may be practiced. While the description is focused on specific implementations and embodiments of the teachings, and is provided to assist in describing the teachings, this focus should not be interpreted as a limitation on the scope or applicability of the teachings disclosed herein.

Figure 1:
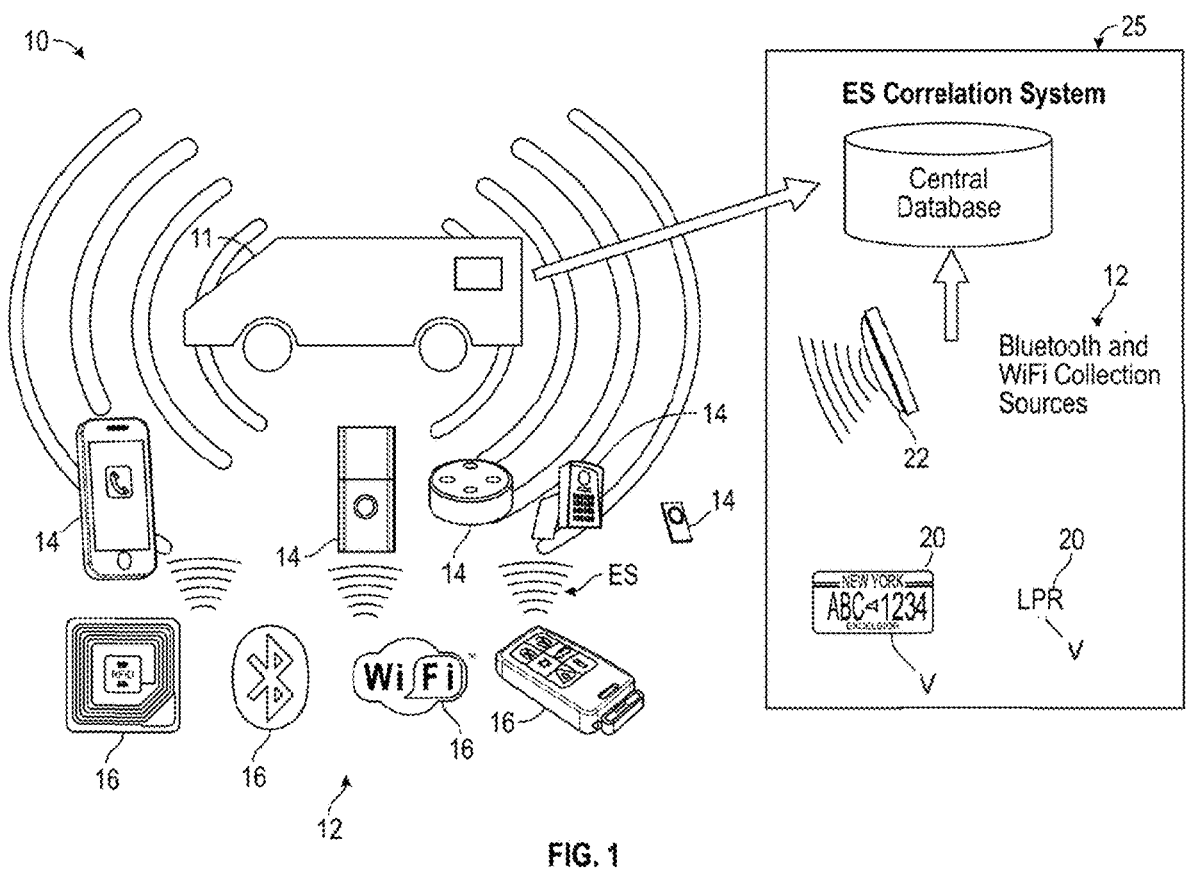
FIG. 1 is a schematic diagram of a surveillance system according to the present disclosure.
Figure 2:
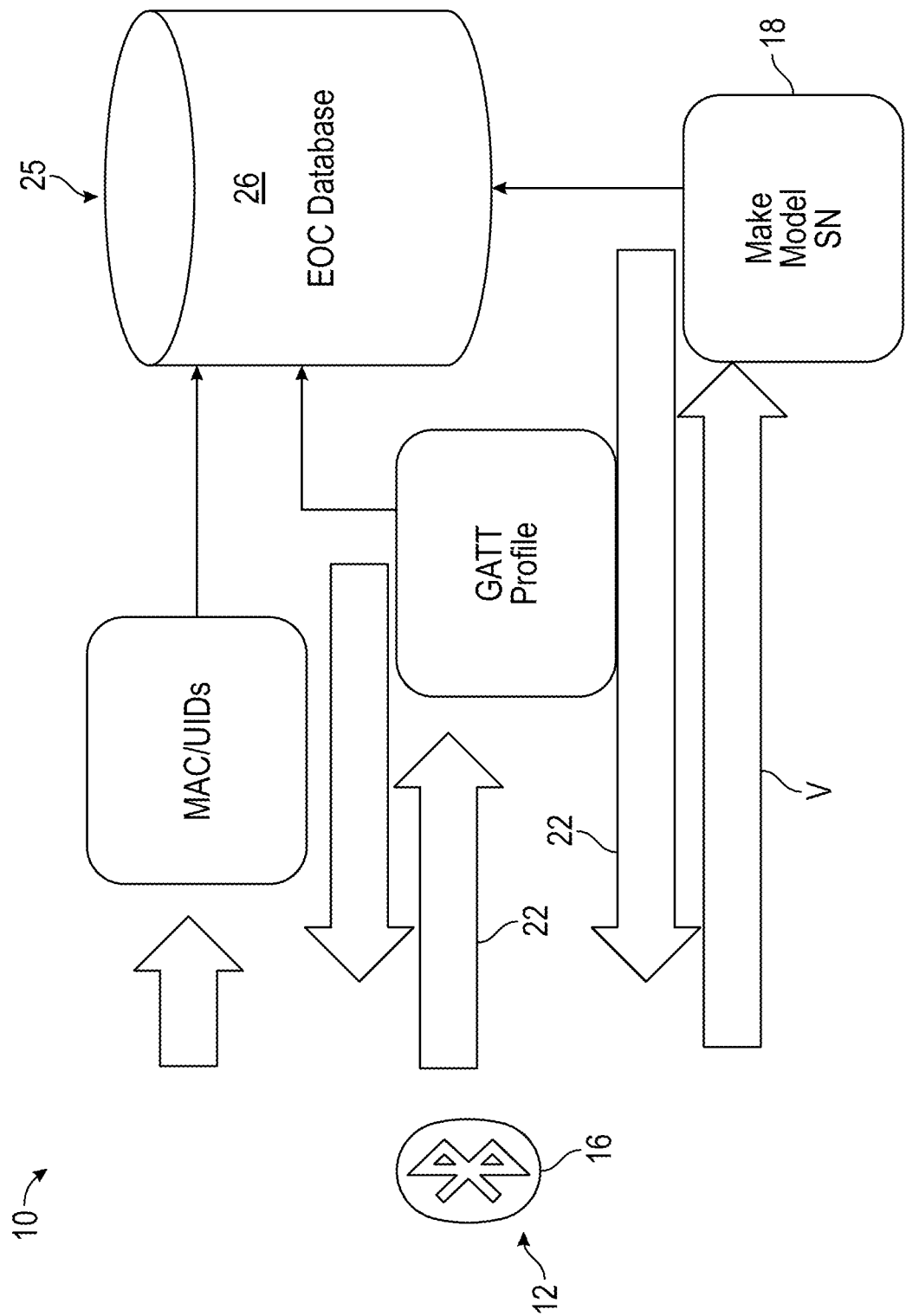
FIG. 2, FIG. 3A, FIG. 3B, and FIG. 3C are schematic diagrams of a surveillance system according to the present disclosure.

FIGS. 1, 2, and 3 provides a schematic diagram of example embodiments of a surveillance system 10 for collecting and correlating electronic signal signatures and/or visual identifier information with targets, such as vehicles, individuals, devices or the like, to build intelligence databases that facilitate electronic surveillance, identification and associating indications of common location and movement of targets throughout selected geographic areas or locations at specified times.

"Electronic surveillance," as used herein, refers to the collection and correlation of electronic signal information that can be used to identify movements of electronic devices, and potentially individuals and vehicles associated therewith. Some electronic devices transmit information that uniquely identifies them. Others transmit data that can be received repeatedly over time such that the content, format, frequency, or pattern of transmission that can provide enough identification data/a signature to be able to resolve identity to a reasonable specificity across time or on subsequent receipt. The combination of electronic device signal patterns can also be consolidated to identify collections of electronic devices travelling frequently together with an individual or vehicle such that the collection pattern itself can identify the source and/or an individual or vehicle associated or correlated with the electronic device(s) with statistically significant specificity. The electronic devices' transmissions can be classified into groups of technology and frequency ranges. Cellular, Navigation, Bluetooth, Wi-Fi, RFID, Keyless entry, medical device, and tracking tags all typically transmit data that can be collected and correlated as needed. In embodiments, the system would not need to interpret, decrypt, or access the actual data payload of the communications. Rather, the broadcast data and identity structures of the communicating devices may be sufficient to resolve an identity.

In accordance with embodiments of the present disclosure, the surveillance system 10 will be adapted to utilize the travel of delivery vehicles 11 and/or other vehicles through a selected region, such as in residential areas around homes, as well as at or around businesses and other locations. The vehicles 11 can have regular or irregular routes through the region, traveling on streets and making stops while recording information about the electronic signals encountered along the route, such as signals from home automation systems, wireless security systems, and other integrated electronic devices for managing home electronics and systems. Such collection of electronic signal data can be used to enhance security applications in residential/home environments and/or other locations. For example, devices like Ring® video doorbells and integrated garage door openers as well as home portal systems provide a platform for monitoring and collecting internal and video events. Some of these devices apply video analytics, but still may generally rely on lighting and visibility of faces and objects.

The addition of electronic surveillance aspects provided by the surveillance system of the present disclosure is less intrusive than off-site video processing for facial or other recognition and can enable collection of data for analysis that could identify individuals even masked or in the dark. The electronic signals can be used to match with other locations, some of which might include better video or identity markers that would allow coordinated mapping of the targets (e.g., suspected intruders, witnesses, etc.) to one or more specific individuals. At rest, however, the data is anonymous and low risk with respect to unwanted privacy intrusion. When mapped at the broader data collection levels by authorized or law enforcement staff, useful correlations of data points emerge. The concept of a neighborhood watch thus could be extended to electronic collection, and the timing and identity of deliveries, visitors, or intruders could be tracked, monitored and reported, without the need for complex or expensive facial, image or license plate recognition. For example, during the holidays, more frequent and later deliveries can be made to homes, while at the same time, more thefts of packages can occur; and the surveillance system of the present disclosure thus can provide for monitoring and identification of delivery persons versus thieves and can provide law enforcement with a means for identifying and tracking such perpetrators.

In embodiments, the surveillance system is configured to enable advanced correlation searching, including correlation analysis that can incorporate/utilize a series of methods, models and processes for the correlation of identifying-characteristics and/or identifiers including license plate, electronic signals, and visual idiosyncrasies, such that an operator can use known factors to identify previously unknown factors or can use patterns of activity, identifying information, electronic signals or visual idiosyncrasies to draw conclusions about a target's location, association to persons, association to locations and/or travel patterns. The surveillance system thus enables an operator to use known factors to identify previously unknown factors or use patterns of activity, identifying information, electronic signals, or visual idiosyncrasies to draw conclusions about the target's location, association to persons, association to locations and/or travel patterns. Using these known patterns and/or associations, the system may form a convoy for different sets of targets and/or electronic signatures. In such embodiments, the introduction of a new or atypical target and/or electronic signature may indicate an event or may enable the system to cross-check such an introduction against reported events.

In embodiments, the surveillance system can leverage existing fleet vehicles typically traveling through a region by utilizing a plurality of collection systems or devices mounted to the vehicles as they move through a selected region, traveling on streets and onto various sites (e.g., driveways, parking lots, etc.). The plurality of collection systems or devices may be included in the surveillance system for collecting electronic surveillance data from fixed locations and/or transient electronic surveillance data as the vehicles move on their routes. The collection systems or devices will include a plurality of sensors or detectors, for example, including Bluetooth and Wi-Fi collection source devices (e.g., to gather data relating to such signals), a cell phone collection application or device, a LPR or ALPR, a video or image capture device, RFID reading devices, and/or another device or set of sensors to capture different types of signals or identifiers. Such collection systems or devices can be carried by the vehicles such that the collected electronic signature data could show the transition of vehicles and people encountered as respective vehicles travel their routes. The plurality of collection systems may gather or receive signals from a number of sources, such as garage door openers, video doorbells, security cameras, motion detectors, home automation devices, smart devices, key fobs, computing devices, home/business Wi-Fi, gaming systems, cellular devices, and/or other devices at a home, at a business, at other locations, and/or on vehicles, or that are otherwise transient/non-permanent, that generate an electronic signal. Accordingly, the mobile collection devices can collect a range of signals for central communication and storage over a wide area. In exemplary embodiments, the surveillance system can produce, over time, a map of the known/expected fixed and transient signals collected over an area, which map can be used for comparison when atypical signals are recorded.

Based on the received electronic signals and/or targets, the surveillance system may generate a convoy or group of targets or electronic signatures for a selected location. In such embodiments, the surveillance system may determine the convoy. In such examples, the convoy may include data relevant to each part of the convoy. Further, additional signals for the convoy may not be recorded, thus reducing the amount of data stored in the surveillance system. Further, using the convoy, the surveillance system may determine whether a new target or electronic signal is a part of the convoy or atypical or different than normal. The identification or discovery of the new target and/or electronic signal may indicate an event is occurring or has occurred. Based on such an occurrence, an alarm may be generated.

In embodiments, the surveillance system can filter and sort results such that the user is directed to signals most likely to have originated from the same set of devices travelling together. "Signals" here can mean electronic signals, visual identifiers, or license plate identification. In addition, the use of the transmitted methods and features of an electronic source with respect to signal strength, advertised methods, order of advertised elements, public and private attributes, and/or signal spectrum utilization by the surveillance system, as described further herein, can be used to collectively identify that source relatively distinctly.

In embodiments of the methods disclosed herein, the method(s) can incorporate correlation confidence assignment whereby correlated results between electronic signatures and targets are analyzed using factors such as a frequency of occurrence, relative representation, signal type, signal receipt location diversity and signal strength profiling to generate and present confidence levels for correlations between signal-receipt events. The methods further will use correlation statistics and analysis to develop relationships between identifiers and non-unique characteristics, such as frequency of identifications, and other factors, captures/associated over multiple encounters.

No single factor may be an absolute or unique identifier. In some embodiments, for example, captured signals or factors can be related to locations that could also be correlated or associated with other factors such as a set of captured license plates, witness statements, etc. The cross-correlations also can be broken into subsets for filtering and generating confidence in the results of such advance correlation searching. The combination of non-unique characteristics and broadcast or visible variables, methods and transmitted values are used to identify a set that are collectively statistically significant in their unique association with the source entity.

In other embodiments, the method can include correlation data noise-reduction at a collection point for filtering incoming electronic signals to maximize the receipt and storage of moving, stable, identifiable signals by analyzing the signal value, strength, spectrum and embedded identification data. The method also can substantially simultaneously reduce and filter signals and identifiers that are 'noise' from likely-unrelated sources and not relevant to the future correlation.

Figure 5:
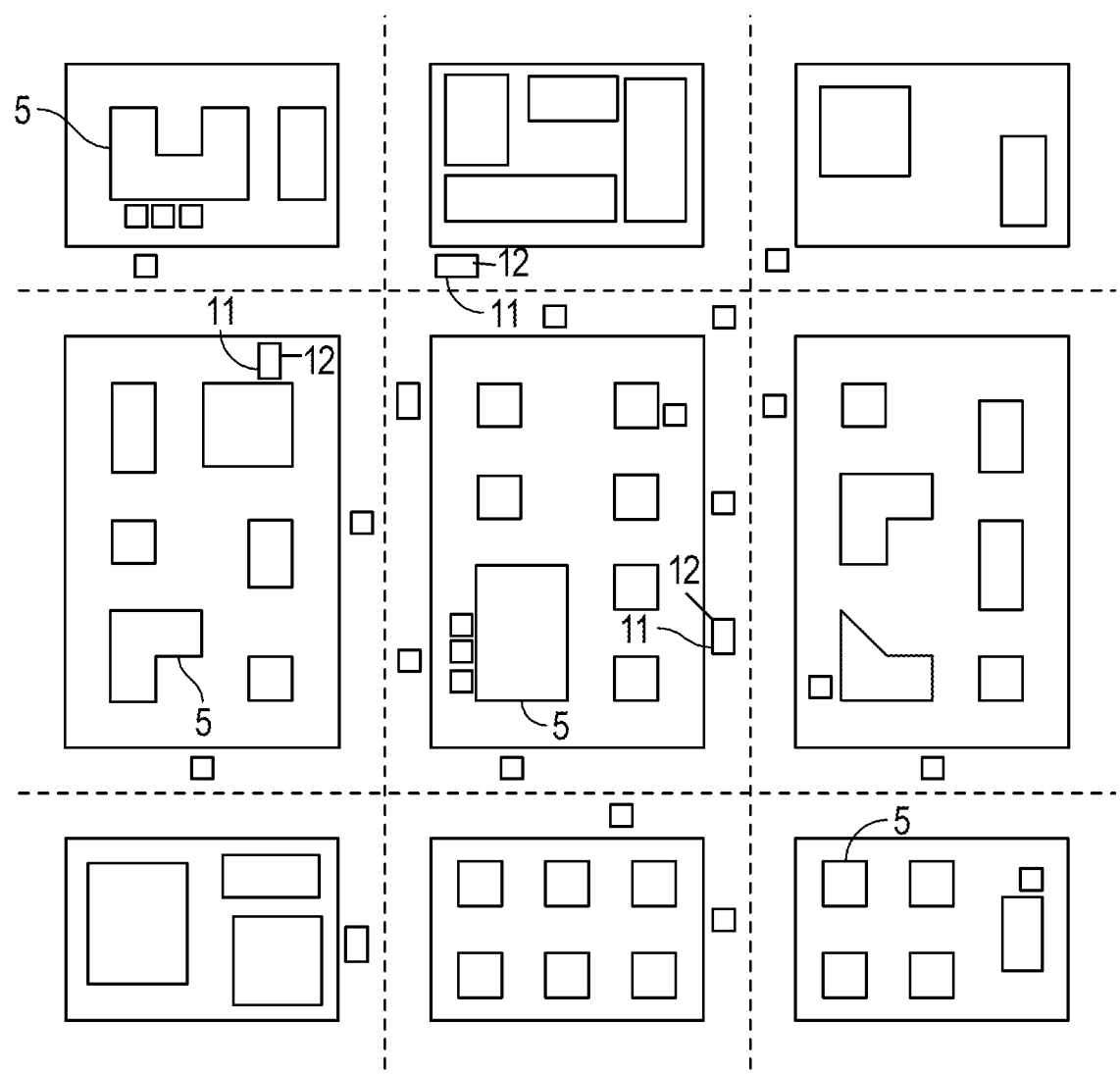
FIG. 5 is a schematic view of an area with various locations, streets, and vehicles, wherein some of the vehicles include mobile components of the surveillance system of FIG. 1.

As indicated in FIG. 1, the surveillance system 10 includes a plurality of collection systems, devices, or assemblies 12 that are mounted on vehicles 11 (e.g., delivery or patrol vehicles) that move through one or more selected regions (e.g., one or more towns, counties, cities, metropolitan areas, etc.), such as for making deliveries. A portion of a selected region is schematically shown in FIG. 5. For example, the collection systems 12 can be mounted on selected vehicles 11 in a fleet of vehicles such as fleet delivery deployments including consumer package delivery agent vehicles, postal vehicles, government vehicles, utility vehicles, transportation vehicles, and/or other suitable public or private fleet vehicles. In some embodiments, the surveillance system 10 can include fixed collection systems 12 installed in stationary settings located at selected geographic areas or strategic/targeted locations about one or more properties such as residential or commercial properties 5, e.g. on a mailbox, post, gutter, adjacent a camera etc. (as indicated at 13 in FIG. 1).

The collection systems 12 generally can be configured to capture or facilitate collection of information related to visual identifiers and/or electronic signal signature information from nearby or proximal transmitting electronic devices 14 associated with targets. The targets generally will include persons, vehicles, or a combination of both in and/or moving about the selected areas or locations. Targets also can include transmitted electronic devices or other objects, without departing from the scope of the present disclosure.

The mobile collection systems 12 can be placed with vehicles 11 that typically move through portions of the selected region for other purposes, such as deliveries, utility inspection, or patrols, or can be otherwise mobile. For example, the mobile collection systems can be carried by law enforcement personnel, postal workers, delivery vehicles and personnel, or couriers on walking or driving along predetermined or varying routes, or could be mounted on drones (e.g., for package delivery, utility inspection, etc.), which can offer greater freedom of movement than vehicles limited to streets and driveways and/or can collect data from the upper floors of high rise buildings. In embodiments, stationary collection systems 12 can be positioned at various locations or collection points about a specific geographic area, e.g., a nearby or proximal to a home, a business, and/or neighborhood, or combinations thereof. Such stationary/ fixed collection systems can be limited by their lack of movement, but can provide continuous data collection at strategic locations.

As schematically shown in FIG. 5, the vehicles 11 carrying the mobile collection systems 12 can move through a region, traveling on streets near homes, businesses, and/or other buildings in the region and encountering other vehicles on the streets and on nearby properties. As the vehicles 11 move through the region and make stops (e.g., to deliver packages, inspect utility equipment, etc.), the mobile collection systems can collect signals from nearby locations, passing vehicles, and parked vehicles. While the routes taken by the vehicles 11 may vary as needed for different delivery destinations, for example, the vehicles can cooperate to cover a wide area over time as they travel through the region; and in embodiments, such vehicles can travel assigned or pre-determined routes, such as for patrolling or delivery of mail, etc.

FIGS. 1-3 further show an embodiment wherein each collection system includes a sensor or sensor assembly 16 configured to collect or otherwise capture the information related to visual identifiers and/or electronic signatures of targets. The sensor or sensor assembly accordingly can include one or more antennae 18 for capture of various electronic signals "ES" (FIGS. 1 and 3); and/or one or more cameras or camera systems configured to capture or facilitate collection of information related to vehicle identifiers "V", such as visual or imaged information (e.g. video or photographic or digital images) related to a license plate of a vehicle and/or other visual vehicle or personal identifiers that can be used to discern, detect and/or otherwise identify or confirm the identity of a target vehicle or person.

For example, in some aspects, such as shown in FIGS. 1 and 3, such vehicle markings can include, but are not limited to, signage, stickers, bumper stickers, non-license plate tags, patterns, position or configuration of component parts, damage to the vehicle, such as scratches, dents, repair marks, etc. and the location thereof on the vehicle, small markings or symbols or other indicia on vehicle components, as well as various other identifiable visual markings, or combinations thereof. In some embodiments, the camera system also can include an Automated License Plate Reader ("ALPR") 20 integrated or otherwise associated with a collection system, or the surveillance system can include ALRPs in addition to, or in place of, one or more collection systems. An ALPR that is integrated into a mobile collection system can record license plate images and/or numbers in transit and/or at stops and can associate the data with time, date, and location of collection.

In addition, or in the alternative, the at least one sensor or sensor assembly also can include an antenna, antenna array, or plurality of antennas 18 configured to capture or otherwise receive electronic signals from transmitting electronic devices associated with the targets for identification/extraction of electronic signatures. The at least one sensor or sensor assembly can include additional sensors, such as IR sensors or other light sensors, without departing from the present disclosure.

As further illustrated in FIG. 1 in some non-limiting example embodiments, the transmitting electronic devices 14 can include, but are not limited to, transmitting electronic devices associated with a vehicle, such as vehicle components including, but not limited to, tire pressure sensors or other manufacturer installed or after-market vehicle sensors, vehicle stereo or entertainments systems, vehicle navigation systems, vehicle infotainment systems, self-driving or driver assist vehicle guidance systems, vehicle Wi-Fi hotspots, other components of internal or external vehicle systems, etc . . . ; and additionally can include transmitting electronic devices associated with persons, packages, utility hardware and/or other types of targets, including, but not limited to, cellular phones and/or other communication devices, tablets, laptops, smart watches, fitness trackers, wireless headphones, RFID tags (e.g., key cards, library books, assets tags, pallet transmitters, pet collars), Wi-Fi hot spots, home automation devices, smart home devices, a garage door opener, a security camera, a doorbell camera, and/or other electronic devices.

Each sensor or sensor assembly is configured to capture or collect signals transmitted by or otherwise emanating from the transmitting electronic devices when the targets get within proximity of the collection systems and/or when the mobile collection systems get within proximity of the targets. For example, transmitting electronic devices can generate data through inter-device communication across networks and for electronic 'advertising' (e.g., for adding devices to networks, rejoining devices to networks, connecting Bluetooth devices, forming ad hoc networks, etc.). Many devices are constantly or frequently polling for partnered devices over 'advertising' frequencies. These transmissions can be captured and provide a profile of the transmitting device. In embodiments, certain devices (e.g., often fixed devices) transmit identity, pairing, and/or connection information for wireless networks and actually transmit a rich set of history related to prior connections, which can also be collected for analysis. For example, devices such as Ring doorbells and integrated garage door openers as well as home portal systems provide a platform for collection and communication of data, and Wi-Fi and Bluetooth devices communicate on common frequencies including 2.4 GHz and/or other suitable frequencies.

In embodiments, the mobile collection systems can include a GPS receiver or other features for tracking location of the mobile collection systems as they are carried on the vehicles during transit. In addition, or alternatively, the mobile collection systems can receive location data from the respective vehicles' tracking system (e.g., GPS). Accordingly, the electronic signal data can be combined with location data identifying the respective locations in which it was recorded along with time and date data to form telemetry data. Stationary collection systems can be installed at a known location and the telemetry can be formed using the known location.

The collection systems also can be configured to receive signals within a collection range, for example, and not limitation, within a prescribed or selected proximity in relation thereto. For example, in some embodiments, the collection systems could be configured to look for and receive signals transmitted within about 200 feet of the collection systems; while in other embodiments, such as to reduce or limit extraneous noise or to help filter such noise, shorter ranges of signals also can be used, i.e. in some locations, the collections systems can be configured to receive signals transmitted within about 100 feet of the collection systems, and in still other embodiments or locations, signals transmitted within about 50 feet of the collection systems. Other, varying ranges also can be used.

In embodiments, the data from the collection devices can be analyzed to compare data for respective locations recorded at different times (e.g., when one or more vehicles with collection systems travel near the respective locations at different times) and segmented into likely fixed and mobile/transient sources to facilitate identification of vehicles and individuals regularly in respective areas. In some embodiments, the collected data can be filtered such that regular or known sources are not stored to increase privacy, while new sources or investigation targets are stored, such as to facilitate a variety of implementations from general data collection to precisely focused investigative storage in order to maximize investigative value and/or maximize residential privacy, respectively.

In addition, as indicated in FIG. 1, the surveillance system includes an intelligence system that is in communication with the plurality of collection systems. The intelligence system 25 is configured to receive information collected or captured by the collection systems and to identify and/or track targets or correlate a target with other targets or electronic devices based on this received information. The intelligence system can be in wireless communication with the collection systems, e.g., through a public or private network using Wi-Fi, cellular, etc. . . . In addition, or in the alternative, the intelligence system and one or more of the collection systems can be connected through one or more wired connections. In this regard, when targets come within proximity of the collection systems, the collection systems will collect visual information and/or electronic signal information associated with the targets and transmit data points or packets of information, e.g., time and location stamped information, related to collected visual and/or electronic signal information to the intelligence system.

The collection systems can include communications circuitry (e.g. one or more transmitters, receivers, etc.) 22 configured to transmit data points or packets substantially simultaneously or generally in real time when targets come within proximity to the collection systems. For example, the collection systems can send one or more data points including information corresponding to each electronic signal or visual identifier as it is captured or can send a data packet including information corresponding to multiple electronic signals or visual identifiers received. In addition, or in the alternative, the collection systems can transmit the data points or packets at specific time intervals, such as every few seconds, minutes, hours, etc. or at other times or intervals after the electronic signals or visual identifiers are captured, without departing from the scope of the present disclosure. For example, in some embodiments, a mobile collection system can transmit data when the respective vehicle returns to its base and the mobile collection system can be connected to a locally-managed wired or wireless network.

In addition, in embodiments such as indicated in FIG. 1, such electronic signal data can be collected by a cellular device 23, such as a cell phone, tablet, etc. running an application configured for collection of such electronic signal data. Alternatively, one or more of the collection devices or systems can include a wireless module or cellular connectivity for transmission of the captured electronic signal data. For example, a series of collection devices can be linked or networked together to a master collection device that receives, compiles and transmits the data received from the other localized collection devices connected thereto to an intelligences system 25 that can be accessed by law enforcement, for example. As a further alternative, the collection device(s) can be linked to home or business Wi-Fi network(s) for transmission of the collected electronic signal data.

Figure 3A:
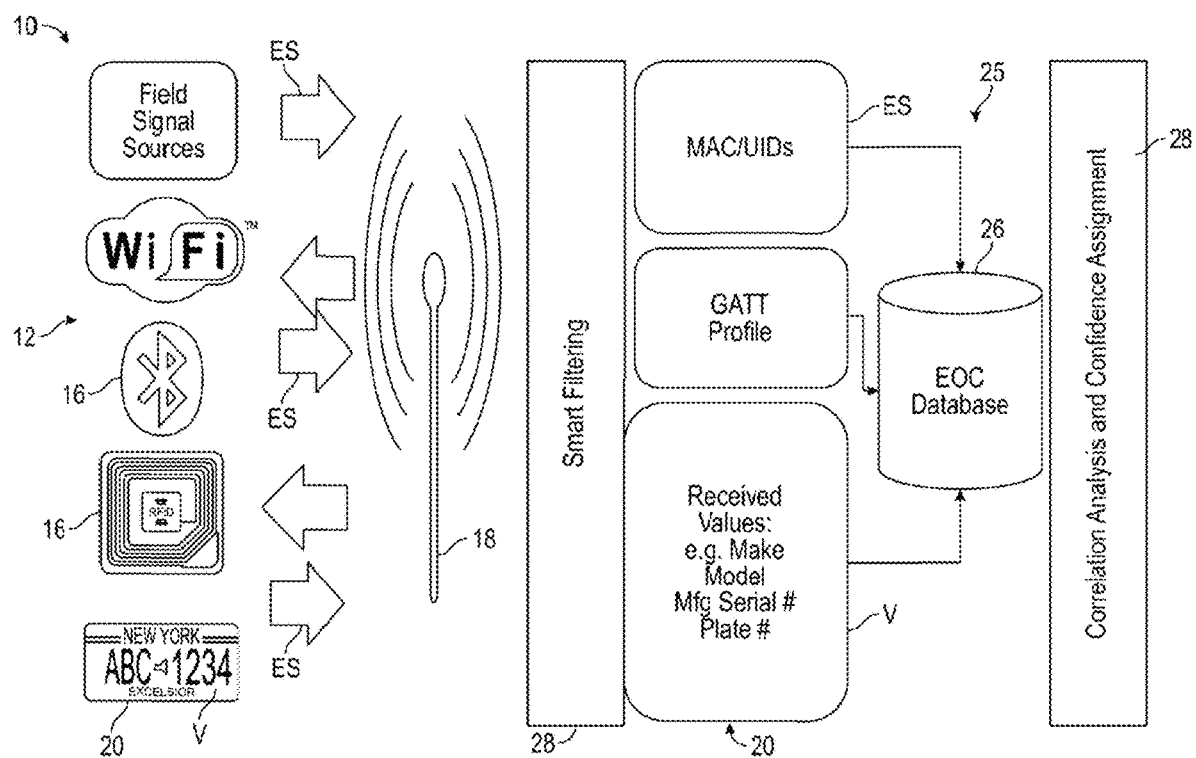

FIGS. 1-3 further show that the intelligence system 25 will include correlation and search capabilities or one or more correlation and search engines 28 (FIG. 3A) and an intelligence database 26. The correlation and search engine is configured to identify or extract electronic signatures and/or other targets associated with a target using collected visual and/or electronic signal information at the collection systems. In particular, the correlation and search engine(s) is configured to ingest or process the data points/data packets to associate or correlate the visual identifiers with the received electronic device signals and/or other visual identifiers of other targets to facilitate the identification or extraction of electronic signatures and/or other targets identifying the targets. In such embodiments, such an association or correlation can be utilized by the correlation and search engine to create a convoy or, in other words, a group of targets which may travel together at varying times on varying dates.

In embodiments, the electronic signatures can include information related to the collected electronic signals of the transmitting electronic devices or combinations of collected electronic signals of the transmitting electronic devices that uniquely identify the targets. For example, and without limitation, a combination of one or more signals from a plurality of transmitting electronic devices (e.g., a watch, cell phone/communication device, headphones, etc.) can include an electronic signature that uniquely identifies a person; a combination of one or more signals from a plurality of transmitting vehicle components (e.g., a vehicle sensor, infotainment system, etc.) can include an electronic signature that uniquely identifies a vehicle; a combination of one or more signals from a plurality of transmitting home or business components (e.g., a garage door openers, computing devices, video doorbells, etc.) can include one or more electronic signatures that uniquely identifies a home or business, which may or may not include vehicles; or one or more signals from a transmitting electronic device can include an electronic signature that uniquely identifies that electronic device.

The correlation and search engine further can be configured to filter or otherwise alter the received electronic signatures (or information related thereto) to reduce or diminish signal noise and facilitate identification or extraction of unique, identifying electronic signatures. For example, the correlation and search engine can apply filtering (e.g., linear or non-linear filters, dynamic noise reduction, etc.) to collected electronic signals to diminish, reduce, or substantially eliminate stationary and variable noise and other values that cannot be usefully correlated with targets, allowing unique electronic signal values to be extracted or identified.

During the course of an investigation, investigators can use the filtered and/or raw data to track atypical and/or suspect devices to search and/or track potential witnesses and/or suspects. The system also can indicate if wireless security cameras or other relevant devices were in the area of an event so that investigators can look into whether those cameras may have recorded aspects of the event and attempt to obtain those recordings, such as by request and/or via appropriate databases.

Figure 3B:
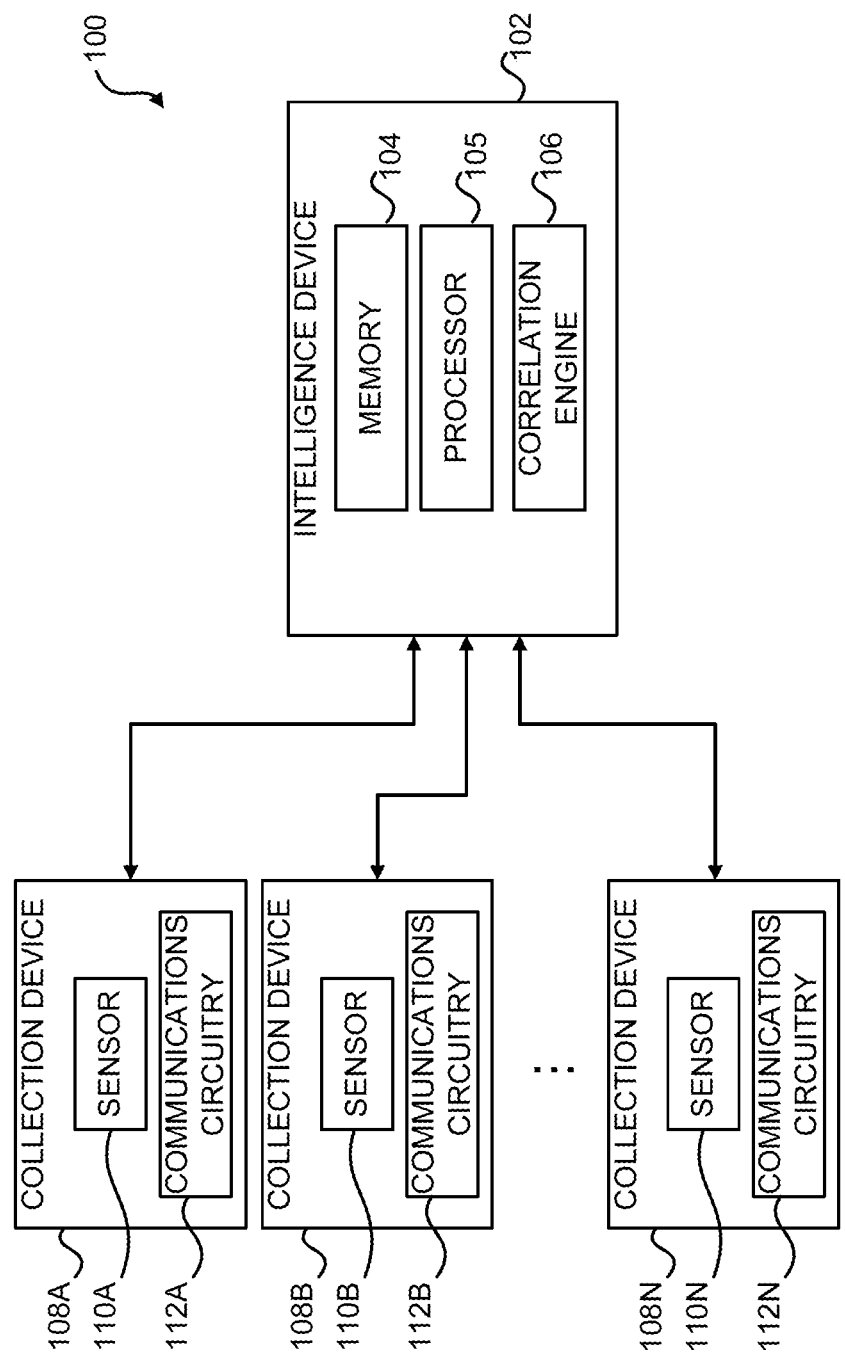

In an embodiment, the intelligence system 25 or intelligence device and/or the correlation and search engine 28 or circuitry further may include a memory and a processor or one or more processors. For example, as illustrated in FIG. 3B, the surveillance system 100 may include an intelligence device 102 and the intelligence device 102 may include a memory 104 and a processor 105, as well as a correlation engine 106. The memory 104 may store instructions executable by the processor 105 or one or more processors. In an example, the memory 104 may be a non-transitory machine-readable storage medium.

As used herein, a "non-transitory machine-readable storage medium" may be any electronic, magnetic, optical, or other physical storage apparatus to contain or store information such as executable instructions, data, and the like. For example, any machine-readable storage medium described herein may be any of random access memory (RAM), volatile memory, non-volatile memory, flash memory, a storage drive (e.g., hard drive), a solid state drive, any type of storage disc, and the like, or a combination thereof. As noted, the memory 104 may store or include instructions executable by the processor 105.

As used herein, a "processor" may include, for example one processor or multiple processors included in a single device or distributed across multiple computing devices. The processor may comprise at least one of a central processing unit (CPU), a semiconductor-based microprocessor, a graphics processing unit (GPU), a field-programmable gate array (FPGA) to retrieve and execute instructions, a real time processor (RTP), other electronic circuitry suitable for the retrieval and execution instructions stored on a machine-readable storage medium, or a combination thereof.

In embodiments, the instructions executable by the processor may include instructions to retrieve data or signals continuously, substantially continuously, or at specified intervals from one or more collection devices 108A, 108B, and up to 108N. Each of the one or more collection devices 108A, 108B, and up to 108N may include at least one sensor 110A, 110B, and 110N and a communications circuitry 112A, 112B, and 112N, respectively. Each of the one or more collection devices 108A, 108B, and up to 108N may further include at least one antenna. The intelligence device 102 may send a request for data or signals and/or scan for data or signals. For example, if a collection device is detected, the intelligence device 102 may connect to or scan the communications circuitry of that collection device and collect the data or signals associated with the collection device. The instructions also may include instructions to correlate captured signals to one or more of packages, utility assets, other vehicles, targets, convoys, and/or locations, as described herein. In embodiments, the instructions may further include instructions to generate an interface or graphical user interface (GUI) enabling a user to search and filter received and correlated data or signals. Other instructions may be included in the memory to perform the functions described herein. In an embodiment, the instructions described above may be included in or may be a correlation engine 106 of the intelligence device 102.

In an embodiment, each one of the one or more collection devices 108A, 108B, and up to 108N may be positioned on a respective vehicle. Each collection device may be mounted to the vehicle, for example, mechanically (for example, via welds, fasteners, and/or connectors, among other types of mechanical connections as will be understood by one skilled in the art) and/or adhesively. Further, each of the one or more collection devices 108A, 108B, and up to 108N may include a power source and/or power supply to provide power to the components within the each of the one or more collection devices 108A, 108B, and up to 108N. In another embodiment, in addition to or rather than including an independent power source and/or power supply, a collection device may connect to a respective vehicles power supply (for example, a battery).

In yet another embodiment, each of the one or more collection devices 108A, 108B, and up to 108N may be a kit or included in a kit. The kit may include the components (the collection device, mounts, wires, and/or other components or devices) described herein, allowing a user or operator to mount the collection device to the vehicle and utilize the collection device.

As used herein, "signal communication" refers to electric communications with/from electronic devices, such as by hard wiring two components together or wireless communication, as understood by those skilled in the art. For example, wireless communication may be Wi-Fi®, Bluetooth®, ZigBee, RFID, and/or forms of near and/or far field communications. In addition, signal communication may include one or more intermediate controllers or relays disposed between elements that are in signal communication with one another.

In embodiments, the correlation engine 106 may generate electronic signatures based on collected electronic signals. Electronic signatures can include information related to the collected electronic signals of the transmitting electronic devices or combinations of collected electronic signals of the transmitting electronic devices that uniquely identify the targets. For example, and without limitation, a combination of one or more signals from a plurality of transmitting electronic devices (e.g., a package (such as a package including a RFID tag), a utility asset, a watch, cell phone/communication device, headphones, or another vehicle, among other potential targets) can include an electronic signature that uniquely identifies a person, animal, or item (such as the package or utility asset); a combination of one or more signals from a plurality of transmitting vehicle components (e.g., a vehicle sensor, infotainment system, etc.) can include an electronic signature that uniquely identifies a vehicle; a combination of one or more signals from a plurality of transmitting home or business components (e.g., a garage door openers, computing devices, video doorbells, etc.) can include one or more electronic signatures that uniquely identifies a home or business, which may or may not include vehicles; and/or one or more signals from a transmitting electronic device can include an electronic signature that uniquely identifies that electronic device. In an embodiment, the correlation engine 106 may generate a prediction of where an animal being tracked via collected electronic signals may appear next.

In embodiments, such signals may include data unique to a device, as well as anonymous. While such signals may, in some embodiments, not specify a user, person, animal or pet, or item (e.g., anonymous), the correlation and search engine may be configured to associate such signals with a target based on known previously captured signals and/or may be configured to generate a target based on those signals. For example, the collected signals can be identified as relating to a certain type of signal and/or a certain type of device, and can be correlated with other identifying signal information to develop an electronic signature for the electronic device, which electronic device can be associated with a target and later identified by comparing additional collected electronic signals to those of a machining electronic signature for a device or devices associated with a target.

The correlation and search engine further can be configured to filter or otherwise alter the received electronic signatures (or information related thereto) to reduce or diminish signal noise (e.g., from a noisy signal) and facilitate identification or extraction of unique, identifying electronic signatures. For example, the correlation and search engine can apply filtering (e.g., linear or non-linear filters, dynamic noise reduction, etc.) to collected noisy electronic signals to diminish, reduce, or substantially eliminate stationary and variable noise and other values that cannot be usefully correlated with targets, allowing unique electronic signal values to be extracted or identified.

Figure 3C:
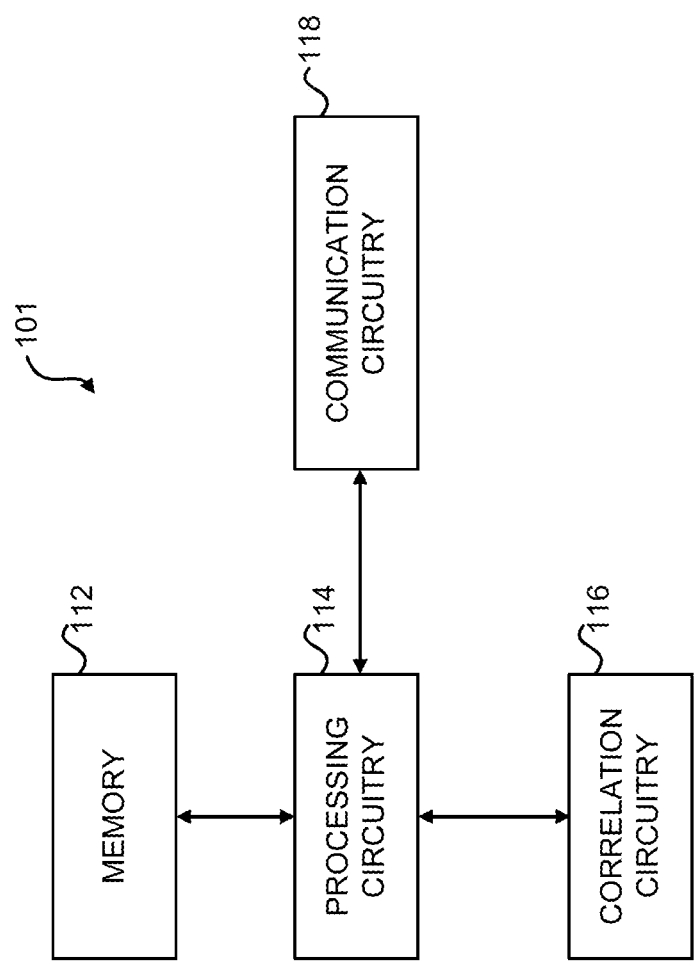

As further shown in FIG. 3C, in an embodiment, the surveillance system 101 or apparatus may include processing circuitry 114, memory 112, communications circuitry 118, and correlation circuitry 116, each of which will be described in greater detail below. While the various components are illustrated in FIG. 3C as being connected with processing circuitry 114, it will be understood that the system 101 or apparatus may further comprise a bus (not expressly shown in FIG. 3C) for passing information amongst any combination of the various components of the surveillance system 101 or apparatus. The surveillance system 101 or apparatus further may include programming or instructions configured to execute various operations described herein, such as those described above in connection with FIGS. 1 through 3B and below in connection with FIGS. 4A through 4G.

The processing circuitry 114 (and/or co-processor or any other processor assisting or otherwise associated therewith) may be in communication with the memory 112 via a bus for passing information amongst components of the surveillance system 101 or apparatus. The processing circuitry 114 may be embodied in a number of different ways and may, for example, include one or more processing devices configured to perform independently. Furthermore, the processing circuitry 114 may include one or more processors configured in tandem via a bus to enable independent execution of software instructions, pipelining, and/or multithreading. The use of the term "processor" may be understood to include a single core processor, a multi-core processor, multiple processors of the surveillance system 101 or apparatus, remote or "cloud" processors, or any combination thereof.

The processing circuitry 114 may be configured to execute software instructions stored in the memory 112 or otherwise accessible to the processing circuitry 114. In some cases, the processing circuitry 114 may be configured to execute hard-coded functionality. As such, whether configured by hardware or software methods, or by a combination of hardware with software, the processing circuitry 114 represents an entity or device (e.g., an element that can be physically embodied in circuitry) capable of performing operations according to various embodiments of the present disclosure while configured accordingly. Alternatively, as another example, when the processing circuitry 114 is embodied as an executor of software instructions, the software instructions may specifically configure the processing circuitry 114 to perform the algorithms and/or operations described herein when the software instructions are executed.

The memory 112 may be a non-transitory machine readable storage medium and may include, for example, one or more volatile and/or non-volatile memories. In other words, for example, the memory 112 may be an electronic storage device (e.g., a computer readable storage medium). The memory 112 may be configured to store information, data, content, applications, software instructions, or the like, for enabling the apparatus to carry out various functions in accordance with example embodiments contemplated herein.

The communications circuitry 118 may include at least one device or circuitry embodied in either hardware or a combination of hardware and software that is configured to receive and/or transmit data from/to a network and/or any other device, circuitry, or module in communication with the surveillance system 200 or apparatus (e.g., one or more collection devices). In this regard, the communications circuitry 118 may include, for example, a network interface for enabling communications with a wired or wireless communication network. For example, the communications circuitry 118 may include one or more network interface cards, antennas, buses, switches, routers, modems, and supporting hardware and/or software, or any other device suitable for enabling communications via a network. Furthermore, the communications circuitry 118 may include the processing circuitry for causing transmission of such signals to a network or for handling receipt of signals received from a network.

The surveillance system 101 or apparatus generally will include a correlation circuitry 116 configured to obtain and/or receive data and/or signals from one or more collection devices (such as collection devices associated with respective vehicles), identify and/or develop electronic signatures based on the data and/or signals, and/or correlate the data and/or signals or the electronic signature to a target, convoy, location, event, and/or other aspect. For example, the surveillance system 101 or apparatus may scan for various signals (e.g., via Wi-Fi, Bluetooth, etc.). Once a signal is detected, the correlation circuitry 116 may request or obtain data and/or signals from the collection device emanating the signal. Once the correlation circuitry 116 obtains or receives the data and/or signals, the correlation circuitry 116 may identify and/or develop an electronic signature or identifying electronic signature based on the data and/or signals.

The electronic signature or identifying electronic signature may be based on various aspects of data and/or signals, such as the type of data and/or signal, a device associated with the data and/or signal, number of times or frequency that the data and/or signal has been detected, location associated with the data and/or signal, among other aspects. The correlation circuitry 116 may correlate the electronic signature or identifying electronic signature with one or more of a target, convoy, location, event, package, route, emergency capacity, and/or other aspect. In an example, the correlation circuitry 116 may determine whether the data and/or signal or the electronic signature or identifying electronic signature is associated with a known or unknown target or convoy and/or whether a target or convoy is in a typical or atypical location and/or may track or enable tracking of a target (such as a package). For example, a package may be tracked to determine whether the package is removed from a delivery vehicle prior to reaching the package's destination. In a further embodiment, the correlation circuitry 116 may generate an alarm, to be transmitted to one or more users, when an unknown target is detected or when a target is in an atypical location. In yet another embodiment, the correlation circuitry 116 may determine emergency capacity for a building and/or vehicles and/or may determine available and/or accessible emergency routes. The correlation circuitry 116 may store the results of the correlation, as well as other information related to the data and/or signal, in a database. The correlation circuitry 116 may generate a user interface enabling a user to search through and/or filter the results.

In addition, and as depicted in FIGS. 4A-4G, the correlation and search engine is configured to catalogue the electronic signatures and/or visual identifiers in the intelligence database with specific identifying characteristics allowing these identified electronic signatures and/or visual identifiers to become unique, identifiable, and searchable. The identifying characteristics can include, but are not limited to, geographical coordinates, time stamps, source manufacturer, source type and unique ID, etc. . . . The correlation and search engine also can be configured to build catalogs or groupings of independent data points/data packets in the intelligence database that allow correlation analysis to show what otherwise anonymous or non-unique electronic signals and/or other visual identifiers (e.g., other license plates) consistently appear with the targets.

"Cluster Analysis" can be utilized to associate signal occurrences that follow a pattern, and the system may dynamically generate associations between the signals in a sample. Cluster analysis can allow new signal patterns to generate new cluster identities and for additional signals to be associated with that cluster when the system identifies the cluster-defining pattern. Further, the cluster analysis then allows otherwise anonymous signals to be categorized to a level of uniqueness that the surveillance system modeling/algorithms can use to identify the source with a confidence of uniqueness based on the presence of signals matching one or more cluster. The cluster-defining pattern criteria may include, but are not limited to, identifying information, content structure, transmission pattern, transmission size, encrypted content structure or content variation.

The surveillance system thus can identify, track, map, catalogue, etc., the presence and/or movements of the targets, in real time for a particular convoy, as electronic signals emanating therefrom occur in proximity to the collection systems or based on image captures of visual identifiers. The surveillance system further can generate alerts or notifications when certain targets (e.g., atypical or unknown) are in proximity to the collection systems. Still further, the surveillance system further allows for the searches or queries of the intelligence database, e.g., for investigating locations or movements of suspects or other persons of interest. The surveillance system, as noted, can generate alerts or notifications when selected known targets are in proximity to the collection systems.

In embodiments, the correlation and search engine can use algorithms, models, statistical models, machine learning algorithms/models, Big Data analysis or statistics, cluster analysis, etc., to infer relationships between transmitting electronic devices and/or targets based on consistency or likelihood of correlation of the visual identifiers and/or electronic signals of the transmitting electronic devices. For example, the correlation and search engine can be configured to evaluate and combine singular collection events at the collection systems with other catalogued events in the intelligence database to develop correlated information related to the intersection of multiple collected/captured electronic signals and/or visual identifiers that occurred at a specific time and geographical area or location. And, the correlation and search engine can use the frequency and/or consistency of electronic signals and/or visual identifiers received at collection systems to determine the relative certainty of association of the transmitting electronic devices and/or targets to develop electronic signatures (correlated electronic devices) or correlated targets (e.g., correlated license plates) for the targets.

By way of example and not limitation, the system can identify high confidence correlations in which a set of signals received in a given location as the vehicle moves through an area and makes stops along its route may indicate vehicles and/or devices expected in respective locations (e.g., vehicles, Wi-Fi networks, security devices, etc. typically found at the respective location). As an additional example, the system might consistently see a set of signals associated with a particular home and the typical occupants and may classify these as having a high confidence of being correlated with the home. If an additional signal begins to consistently appear with that pattern, the system may be configured to retain the new signal as 'known' within the correlation, or if configured for higher security, may generate or create a notification indicating that a change has occurred, thus allowing the owner to assess if a new device was acquired or if some suspicious new source has appeared. The presence of an additional new signal (e.g., a new signal which is not part of a known pattern of identification as it appears over time) may be added to a category of known devices such that its presence over time with known devices may make the new signal less likely to be considered a concern when that device appears without the other known devices.

The correlation and search engine can be programmed to determine a likelihood or probability that a specific electronic signal, a combination or set of electronic signals, and/or other target or targets are associated with a target or location (e.g., a home or neighborhood), and if the determined likelihood or probability meets a prescribed/selected likelihood or probability threshold, the engine will identify or extract an electronic signal or combinations of electronic signals as an electronic signature or electronic signatures to be associated with that target. In one embodiment, the likelihood or probability threshold can be about 70% or more (e.g., above 75%, above 80%, above 85%, above 90%, above 95%, above 98%, etc.) that an electronic signal, combination/set of electronic signals, and/or other targets are associated with a particular target, convoy, or location.

For example, the correlation and search engine may correlate two or more license plates and one or more electronic devices based on multiple events. Based on such a correlation, a prediction of whether a particular vehicle may be present at a specific location may be determined by the correlation and search engine. Further, the two or more license plates may be from or may define a convoy (e.g., group of targets or target vehicles). In such an example, the electronic devices may be associated with the convoy.

In some embodiments, the correlation and search engine can be configured to determine or identify a location at which a visual identifier and correlated electronic signature and/or other visual identifier are matched to enable tracking and/or verification of targets at such a location. In addition, or in the alternative, the correlation and search engine can be configured to associate identifying electronic signatures and/or other visual identifiers with a location, such as a home or neighborhood, to allow for comparison between a convoy and new, atypical electronic signals. For example, once the engine has records correlating electronic signatures and/or other visual identifiers for a selected location, e.g., a license plate likely to be located at or near a specific visual vehicle identifier, associated with the specific visual vehicle identifier, e.g., a specific license plate number, the correlation and search engine will be able to detect the likely presence of a vehicle and its associated license plate without visual information of that specific vehicle, e.g., a camera may or may not be used.

In addition, or in the alternative, an existing ALPR can be modified or retrofitted to include components of the collection point systems to enable collection of electronic signals jointly with license plate reads. Further, in some embodiments, collection systems with or near cameras or ALPRs can be used in connection with collection systems without cameras or ALPRs, as indicated at 20 in FIGS. 1 and 3.

As a result, electronic data points from less expensive collection systems can be used to provide more precise tracking than ALPR alone. That is, the lower cost collection systems can increase collection density beyond the collection of ALPR or camera records, enabling data from both collection system types to be combined to provide more detailed intelligence and increased accuracy of verification or authentication of possible targets, including providing monitoring personnel (e.g. law enforcement, security, or other personnel) with an increased level of confidence of locations of potential criminals, stolen or other vehicles of interest.

Additionally, or alternatively, collection systems without cameras (or with cameras) can be positioned in areas or locations that cannot be accessed by a vehicle, such as on trains, near railways, around public buildings, etc., to enable collection of electronic signals from persons away from their vehicle, e.g., for cataloguing, tracking, mapping, etc . . . positions or movements thereof.

The intelligence system generally includes one or more processors, controller's, CPUs, etc., and one or more memories, such as RAM, ROM, etc., in communication with the one or more processors. And, the engine can include computer programming instructions stored in the one or more memories that can be accessed and executed by the one or more processors to facilitate execution of the processes thereof, e.g., correlation of information, identification and tracking of the targets, searching of the intelligence database, etc.

The correlation and search engine can process the information from the received data points or data packages to correlate the received signal information with the visual information to develop electronic signatures uniquely identifying each vehicle or person at a selected location based on the received electronic signals or combinations thereof, and also can populate the intelligence database with the signature information identifying each vehicle and/or person. As multiple license plates may be read at a time and multiple signals detected, correlation may occur when or if multiple data points exist for a particular vehicle. Operators then can search or query the intelligence database, e.g., using a user interface or GUI as shown in FIGS. 4A-4D, for identification, mapping, tracking, etc., of vehicles, people, and/or locations at specific times.

Figure 4A:
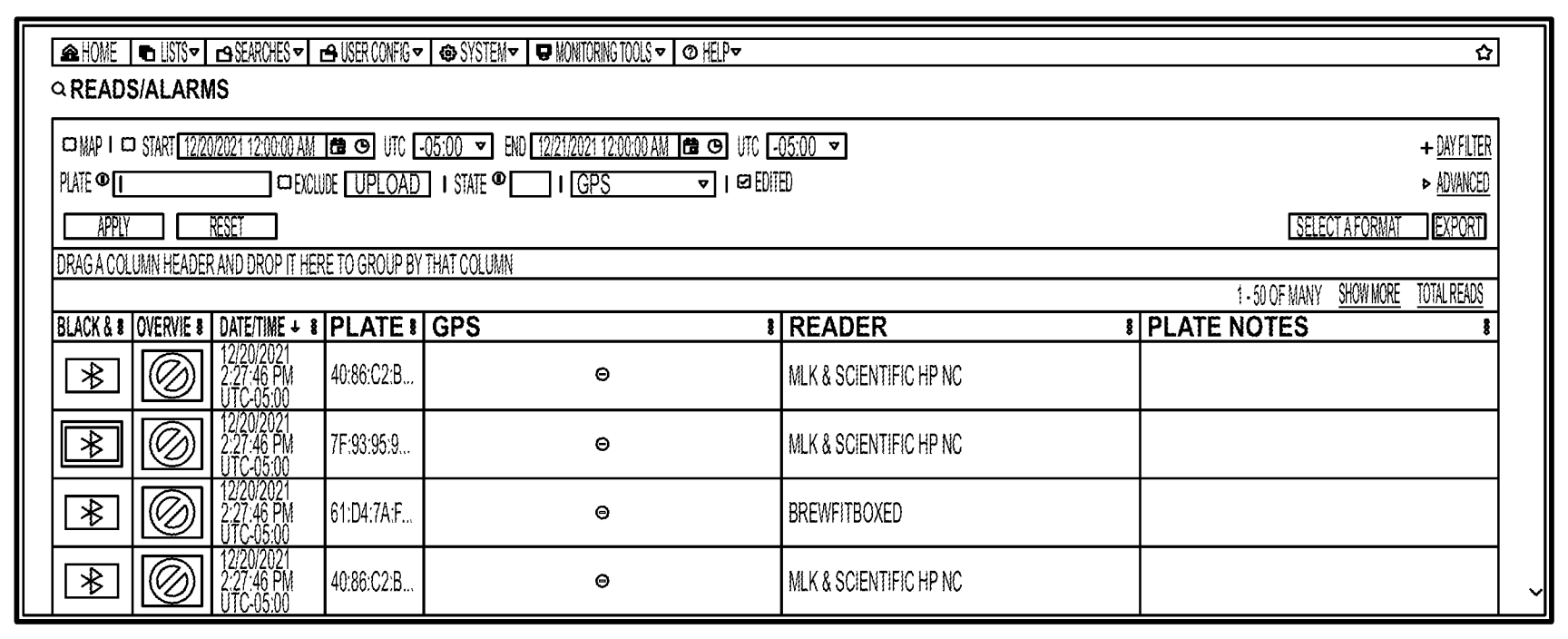
Figure 4B:
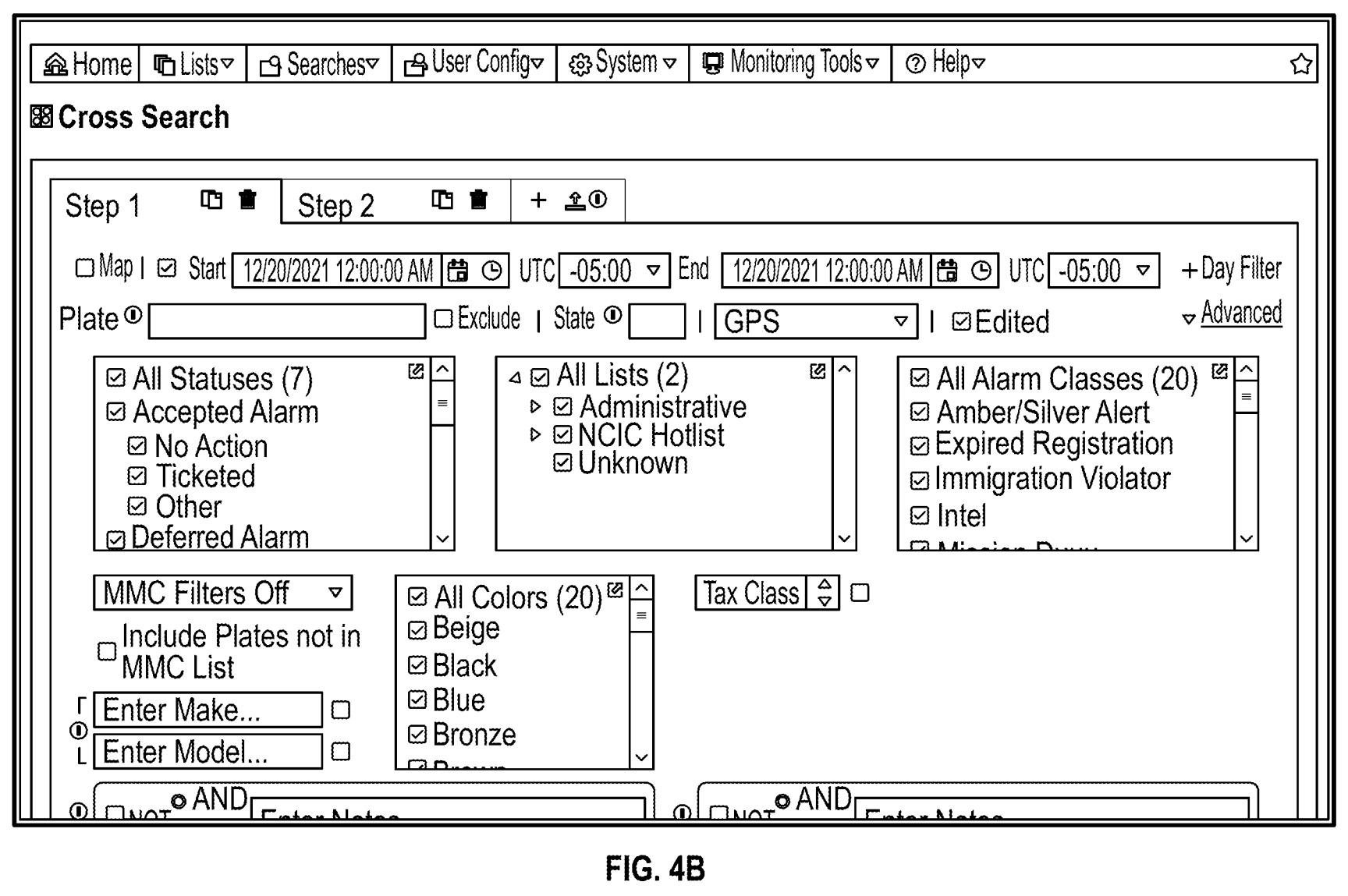
Figure 4C:
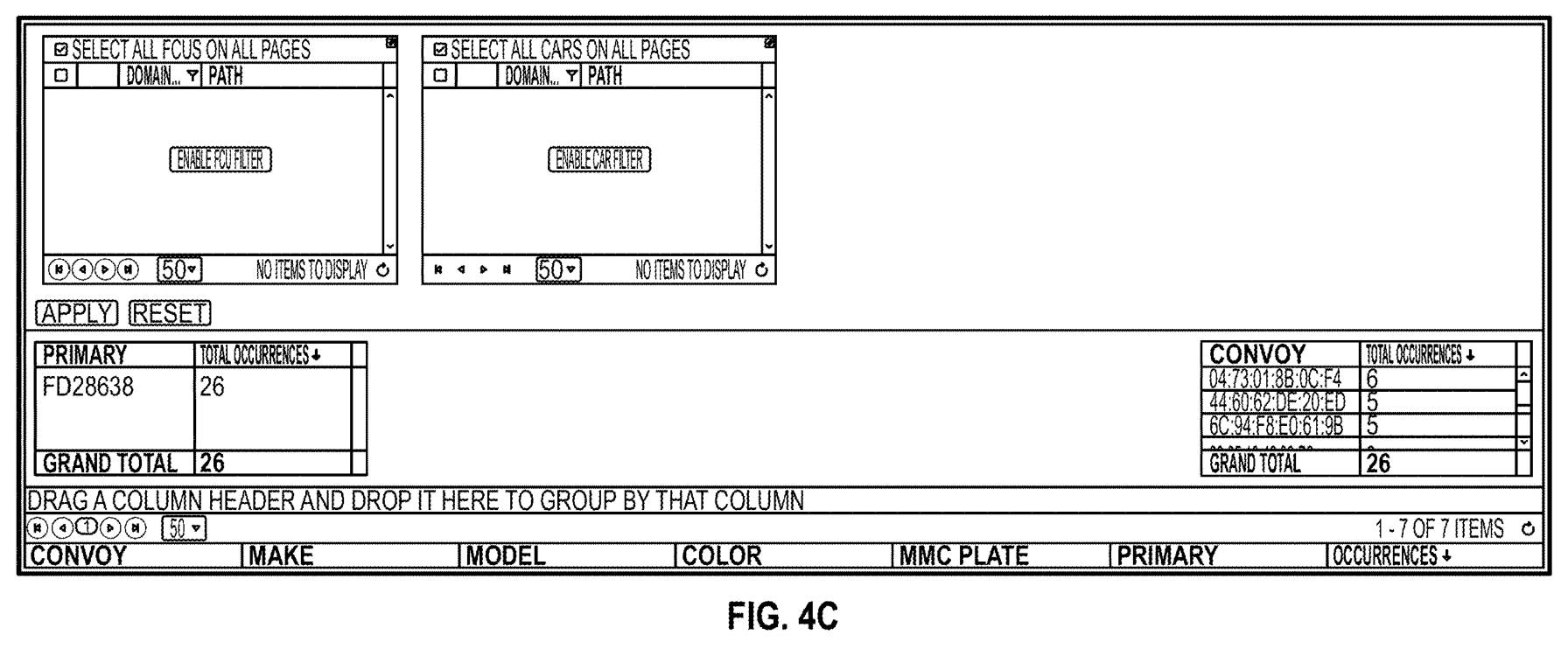

For example, in FIG. 4A, a user may search for a particular vehicle based on a license plate number or other identifier or signature. In FIG. 4B, a user may perform a cross-search. A cross-search can include searching for a particular parameter (e.g., a license plate number, a convoy, an electronics signature, and/or some other identifier) in a first step and then perform additional searches in additional steps (e.g., step 2, step 3, etc.). In yet another example, as depicted in FIGS. 4C-4D, a user may search for a particular convoy or search based on selected characteristics of a convoy.

Summary use cases utilizing embodiments of the surveillance system of the present disclosure can include fully automated, scan-free real time vehicle and package location service, electronic signal correlation processing, mail and package delivery notifications, transient signal schedule tracking, regular transient signal reporting to improve bus or transport arrival or departure predictability and alerts, anomaly/intrusion detection, lost tagged-pet tracking, lost package tracking, integrated known-visitor security and reporting for integrated utility and energy management, security management for commercial space rentals, hotel and campus security systems, integrated video surveillance retrieval and queueing systems, general asset management improvement, law enforcement signal source correlation and tracking, and/or other applications/uses.

By way of example only, and not limitation, in cases such as for automated, scan-free real time vehicle and package location services, e.g., to notify a recipient and record where and when a package was delivered and to confirm delivery instructions therefor. In embodiments, such as when RFID or other tags are used for packages, the surveillance systems can be used to track lost or stolen packages, such as when packages are delivered to a wrong location, are delivered and subsequently taken from the delivery location, or are reported as delivered, but either remained on the delivery vehicle or were otherwise disposed of without being delivered.

In other examples, transient signal schedule tracking can include determining the schedule of vehicles in an area, such as school buses, transit vehicles, mail delivery vehicles, etc. Lost pet tracking can include, for example, a mobile or fixed collection system happens to read a tag associated with a lost pet (e.g., where a pet has been "chipped" with an identification tag or marker), which id tags/markers can be included on a hot list and can generate an alert with the location of the lost pet to help focus a search. In exemplary embodiments, integrated known-visitor security and reporting for integrated utility and energy management can include informing security personnel that visitors and/or atypical devices/vehicles are in an area, such as in gated communities, restricted access facilities, etc. Also, integrated utility and energy management can relate to signals received from cable company assets, wireless company assets, electric/gas company assets, etc., which can include communication modules for relaying operation information to utility personnel (e.g., without having to climb utility poles). Such signals from utilities equipment may be identified by the surveillance system and can be associated with relatively precise locations, and the system can generate alerts if such devices were found to be non-functioning. For example, the system may determine that a Wi-Fi hotspot is not working and alert the associated cable company.

In exemplary embodiments, integrated video surveillance retrieval and queueing systems can relate to integration with video databases, such as Neighbors by Ring, etc., in which users upload security camera videos, and investigators can review videos based on location, time, and date data associated with a particular event when the surveillance system detects relevant camera devices in the area of the event. In embodiments, general asset management improvement can include reporting data related to signals received from tagged assets for a partner agency or business, which data can be used to determine if assets are being properly used, such as determining if vehicles or equipment are making routes or are in appropriate locations and/or are functional.

Another exemplary summary use case utilizing embodiments of the surveillance system of the present disclosure can include occupancy scanning and device location mapping. For example, circumnavigating a building or area could triangulate, count, and map signal sources in the interior providing occupancy information, which can help law enforcement and/or personnel locate potential threats in a building (e.g., during a robbery or hostage situation, for locating an enemy, etc.) and/or can help identify potential locations of persons needing rescue, such as in the case of a fire or building collapse. Additionally, anomaly and/or intrusion detection can be correlated with the capture of electronic signal information by the surveillance systems to help law enforcement in investigations; and for integrated known-visitor security and reporting for integrated utility and energy management, and for management of commercial and residential spaces. In another example, a mobile system traveling through an area regularly could capture and map the status of utility assets or other sources and provide mapping information. In a further example, emergency services could map device occupancy by device class to assure evacuation and efficiently manage rescue operations.

Figure 4E:
Figure 4F:
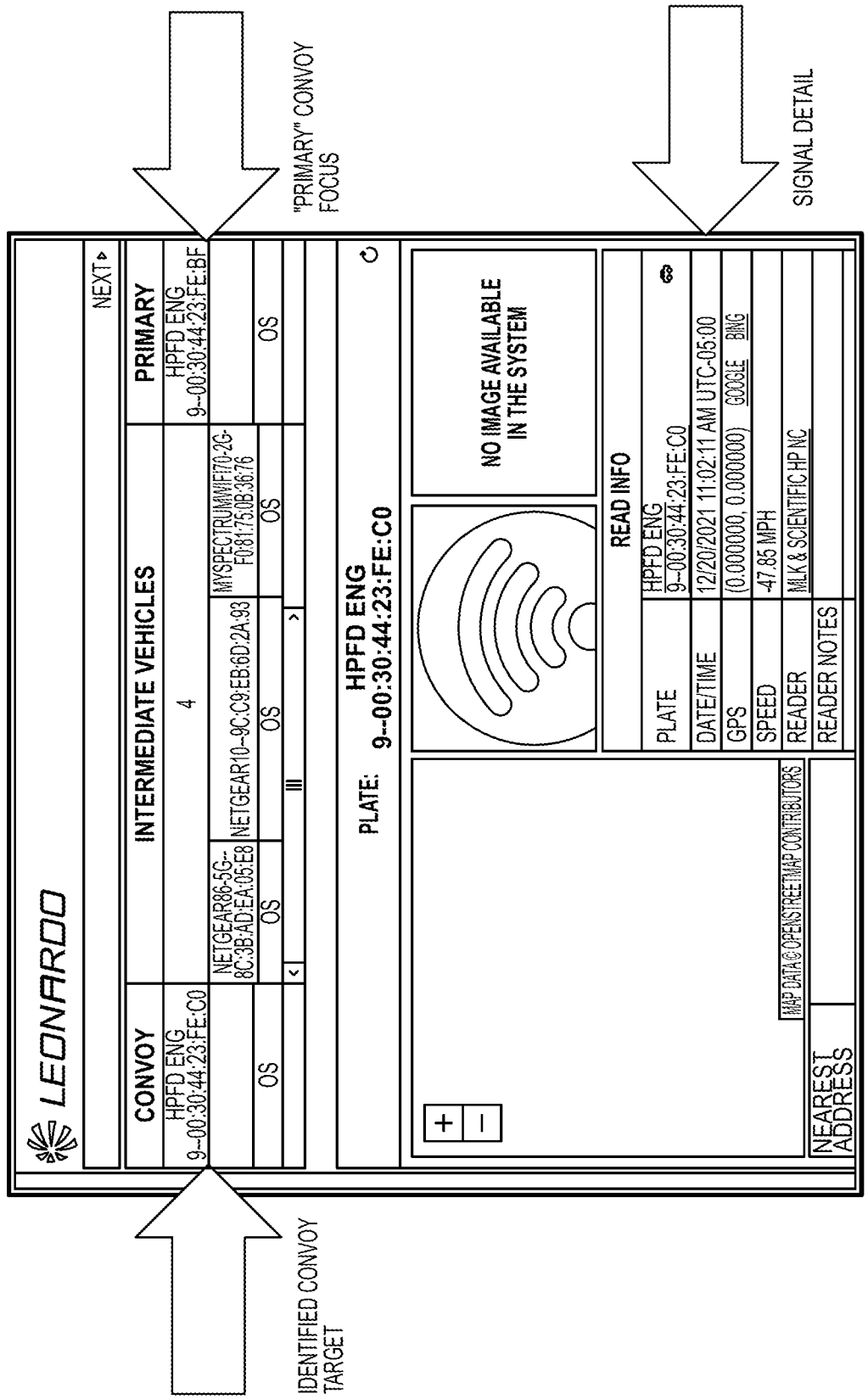

By way of example only, in some embodiments, the surveillance system can be configured to capture an electronic signature and associated information from a target, and can associate such electronic signature, as well as associate other targets, and associated information with the target's identification, e.g., license plate number or other visual identifier, with the correlation and search engine, and then allow searches for or provide alerts or notifications on receipts of similar electronic signature information and/or visual identifier at one or more of the collection systems. In an embodiment, the association or correlation of two or more different license plates, which may include correlated one or more different electronic devices, may form a convoy. Convoys may be selectable, as illustrated in FIG. 4D-4F, and/or locations for searching targets or convoys can be selectable.

Figure 4G:
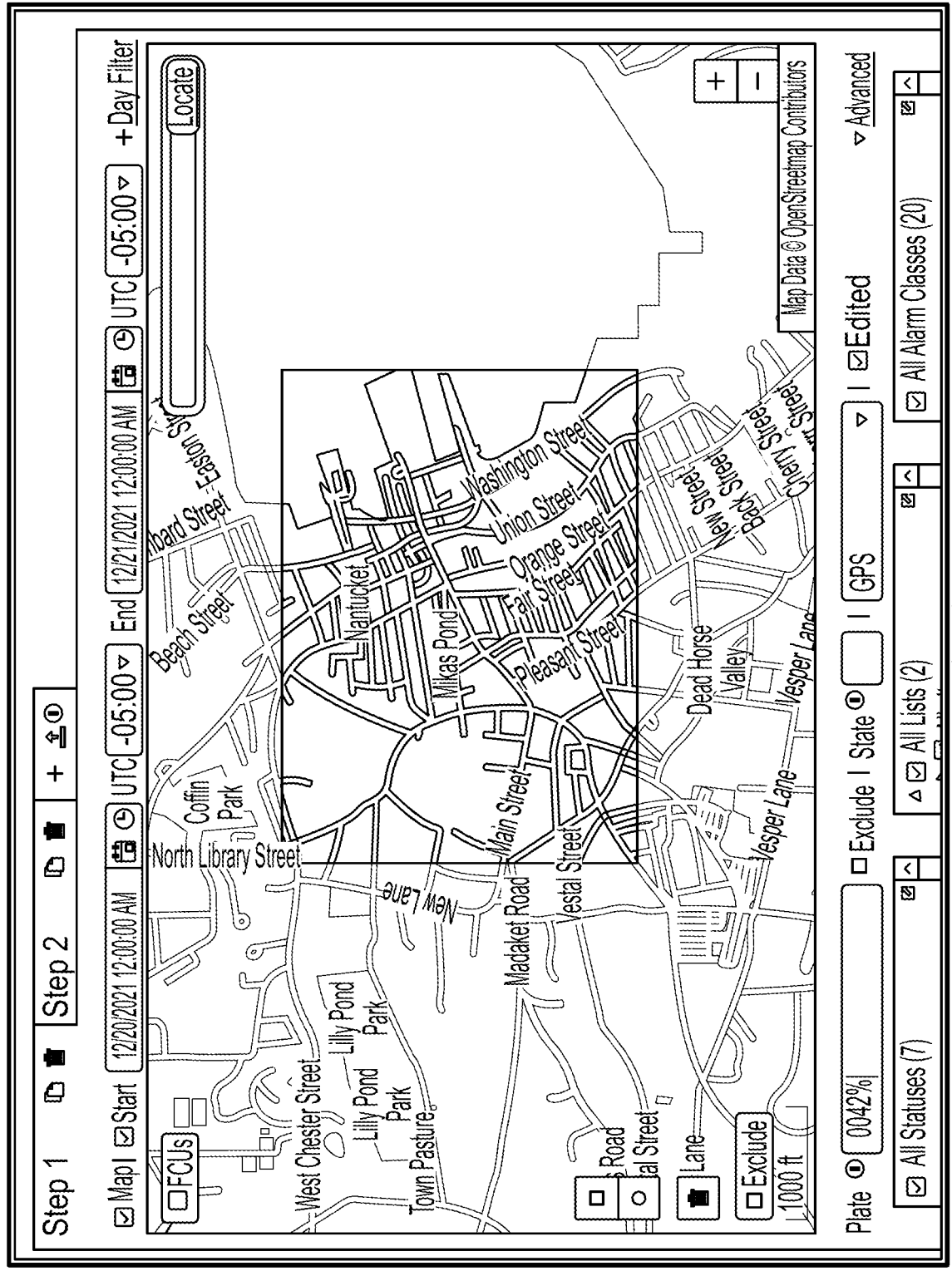

The surveillance system further can be configured to allow for search inquiries or scans of one or more specific electronic signatures associated with a target or convoy or may search for a specific convoy or target associated with one or more convoys, and to provide search results including known location data points, in the intelligence database. As depicted in FIGS. 4E-4G, the search results can include maps or other images showing the locations of the collection systems that captured electronic signals associated with the one or more electronic signatures searched at the time of capture, e.g., indicating the selected target's or convoy's presence or movements about a prescribed location or area.

In addition, or in the alternative, the search results can include groupings or listings of search results associating the target, electronic signals, and/or convoy searched with information related to the collection systems which captured target, electronic signals, and/or convoy associated with the two or more targets and/or one or more electronic signatures searched. The grouping or listing can include images captured (e.g., images of the person, vehicle, vehicle license plate, etc.), temporal information (e.g., the date and time the visual or signal information was collected), the visual identifier (e.g., license plate number), location information (e.g., GPS coordinates, state, city, etc.), information identifying the collection point system, states of the collection (e.g., normal read, error, etc.), etc.

The surveillance system can generate an alarm or alert when the specific electronic signature(s) and/or visual identifier distinct or atypical from a convoy is captured at a selected location. The alarm may alert a user of the presence of an atypical or distinct target(s) at or near the selected location. The alarm or alert can be provided to the operator of the surveillance system and/or local authorities, e.g., law enforcement or other third parties. In some embodiments, the target can be selected based on a specific criteria associated with the target of the convoy, e.g., arrest warrant, Amber or Silver Alert, expired registration, immigration violation, etc . . . , and when the labeled electronic signatures and/or visual identifiers are collected at one or more of the collection systems, the proper authorities can be notified.

In still further embodiments, the surveillance system further can indicate or determine changes in association or travel of suspects based on variations in electronic signatures associated with a location. For example, based on unique electronic signatures, the surveillance system can indicate whether particular individuals are or were traveling with a vehicle through or in the selected location, which can allow investigators to determine whether suspects were actually at the selected location during an event.

By way of example and not limitation, in an embodiment for analysis of electronic signature data, an initial goal is to find associations of electronic signatures and/or targets to known ALPR targets. For this, multiple locations can be used. The repeated linking of a target (e.g., a license plate) to electronic signatures and/or other targets can be the value. For example, a particular license plate can be associated with a convoy, the convoy can be associated with a list of electronic signatures, and the convoy and/or electronic signatures associated with non-LPR sites.

In some aspects, the surveillance system and the operation thereof can include the harvest or collection of values in convoy searches when a target value is unknown. Such a search can be based on a date/time, tight correlations, and/or other factors. Reading a signal simply at one site or by one mobile collection system may not be valuable, but a read at two or more sites (e.g., by one or more mobile and/or stationary collection systems) may indicate that a target is moving and may be valuable or more valuable than a single read of a potentially stationary target. Using such systems and methods described herein, a search can be quickly refined to values that are read at multiple sites and have convoy hits/correlation or association, with and/or without a plate match. A convoy can be limited by site and by multiple electronic signature reads at a series of sites, e.g. two or more successive sites.

In embodiments, incorporation of mobile collection systems into delivery vehicles can facilitate and/or enhance package tracking. For example, by including RFID reading technology inside and outside of the vehicle, package tracking detail can be increased, providing the locations of packages in real time along with a location at which a package moves out of range of the RFID reader on the respective vehicle (e.g., if the package is moved away from the vehicle and/or the vehicle moves away from the package). In embodiments, RFID source tags could be introduced to all, or to high-value packages for increased accuracy in tracking. The RFID technology and on-vehicle reading can provide positive asset tracking, actively and regularly confirming one or more items are onboard a vehicle during its travels, which can facilitate accuracy assurance and last-known-location tracking for accidental off-loads. In exemplary embodiments, driver key-fobs could also improve auditability of shift and activity information. In embodiments, the addition of internal-facing and external-facing RFID reading could all be included at minimal incremental cost above a single read-point in order to help control the expense of incorporating an RFID system into a fleet of delivery vehicles. In embodiments, the surveillance system with the integrated package tracking system can generate alerts to the driver and/or other suitable personnel, such as if items left the vehicle during the driver's absence (e.g., the system determines that devices associated with the driver, such as a key fob, mobile phone, barcode scanner, RFID tag, etc., moved away from the vehicle around the time of an event) and/or if an item additional to the intended delivery load was inadvertently taken off at an incorrect location.

In exemplary embodiments, the integration of package tracking with other electronic surveillance can facilitate the response to a loss of a package with information about what devices, and thereby people and vehicles, may have been in range at the time of the incident (e.g., for identifying potential witnesses and/or suspects of a crime). In another example, the integrated package tracking can help deter and/or investigate package dumping by delivery personnel. The system also can help detect the theft of a package after it has been delivered and can help track the stolen package, such as when a package is recorded as being properly delivered but is later detected along with atypical devices associated with unexpected persons and/or vehicles. In embodiments, the electronic collection by the mobile collection systems of the present disclosure can also help increase the accuracy of the location information (e.g., from GPS) using the location of known, fixed signal sources, such as Wi-Fi routers and utility sources, when signals from such fixed sources are recorded by the mobile collection system at the time of a loss.

In embodiments, surveillance systems as described herein that utilize mobile collection systems can provide several benefits over surveillance systems that use data gathered from fixed sites alone. When the mobile collection systems are mounted on delivery vehicles and/or other private or public fleet vehicles, which may have irregular routes and/or visit locations at irregular times, nevertheless can result in collecting a rich data set for analysis of device location and anomalies over a wide area. For example, data can be collected at least occasionally at many sites without fixed collection systems over the region. In embodiments, a database resulting from a coordinated and consolidated feed of the data generated by the surveillance systems of the present disclosure could be an investigative, intelligence, and research foundation for everything from law enforcement to traffic analysis to route audit and efficiency management.

In addition, the surveillance system of the present disclosure can have significant benefits over video technology since it would be less invasive, more omni-directional, improving coverage, and would not require complex video redaction to remove sensitive image areas or concerns about unintended video capture. At rest, the data is anonymous and low risk with respect to unwanted privacy intrusion. When mapped at the broader data collection by authorized or law enforcement staff, useful correlation of data points emerge. That said, the system could be deployed with or without integrated video capture technology. If video collection so collocated, integrated event recording and queuing would be possible.

The foregoing description generally illustrates and describes various embodiments of the present disclosure. It will, however, be understood by those skilled in the art that various changes and modifications can be made to the above-discussed construction of the present disclosure without departing from the spirit and scope of the disclosure as disclosed herein, and that it is intended that all matter contained in the above description or shown in the accompanying drawings shall be interpreted as being illustrative, and not to be taken in a limiting sense. Furthermore, the scope of the present disclosure shall be construed to cover various modifications, combinations, additions, alterations, etc., above and to the above-described embodiments, which shall be considered to be within the scope of the present disclosure. Accordingly, various features and characteristics of the present disclosure as discussed herein may be selectively interchanged and applied to other illustrated and non-illustrated embodiments of the disclosure, and numerous variations, modifications, and additions further can be made thereto without departing from the spirit and scope of the present disclosure as set forth in the appended claims.

The invention claimed is:

1. A surveillance system comprising:
   a plurality of collection systems, one or more of the plurality of collection systems mounted on one of a plurality of vehicles;
   wherein each of the collection systems comprises:
      at least one sensor configured to collect electronic signals from proximal electronic devices, and
      communication circuitry to transmit collected electronic signals and data indicative of a route associated with at least one vehicle associated with the collection system; and
   an intelligence device configured to receive the collected electronic signals and the data indicative of routes traversed by the vehicles transmitted from the collection systems;
   wherein the intelligence device comprises:
      a database, and
      correlation circuitry configured to:
         determine a correlation between one or more of the collected electronic signals associated with one or more of the electronic devices and one or more targets determined to be typical to an area associated with the route and develop an identifying electronic signature associated with each of the one or more targets determined to be typical to the area,
         determine a correlation between of at least one collected electronic signal associated with at least one electronic device and one or more targets determined to be atypical to the area associated with the route and produce develop an identifying electronic signature associated with the one or more targets determined to be atypical to the area, and
         catalogue and store results of the correlations in the database.

2. The surveillance system of claim 1, wherein each of the collection systems further includes a positioning device associated with a vehicle on which the collection system is mounted for generating location data associated with the collected electronic signals, and wherein the communication circuitry is configured to transmit the location data along with the collected electronic signals.

3. The surveillance system of claim 1, wherein one or more of the collection systems further includes an automated license plate reader (ALPR) configured to capture license plate numbers and/or other identifying vehicle characteristics, and wherein the correlation circuitry of the intelligence device is configured to correlate at least one captured license plate number transmitted from the one or more collection systems with one or more of the collected electronic signals.

4. The surveillance system of claim 1, wherein the plurality of vehicles comprise a delivery vehicle, and the one or more of the collection systems includes one or more radio frequency identification (RFID) readers positioned on the delivery vehicle, and wherein the one or more RFID readers is configured to collect RFID tag numbers associated with packages in the delivery vehicle and generate a record indicating when the packages are removed from the delivery vehicle.

5. The surveillance system of claim 4, wherein the intelligence device is configured to detect differences between an expected delivery location of a package and a location of the delivery vehicle when the one or more RFID readers indicates that the package is removed from the delivery vehicle.

6. The surveillance system of claim 1, wherein the at least one sensor of each of the plurality of collection systems includes one or more readers configured to read RFID signals, Wi-Fi signals, cellular signals, or other wireless signals, a license plate reader, a camera, or combinations thereof.

7. The surveillance system of claim 1, wherein the one or more electronic signals include one or more identifying signals, location data, a time stamp, images, video, source type, or combinations thereof.

8. The surveillance system of claim 1, wherein each target comprises at least one transmitting electronic device, a package including a RFID tag, a person, a vehicle, a convoy, one or more utility assets, or combinations thereof.

9. A surveillance system comprising:
    a plurality of mobile collection systems, one or more of the plurality of the mobile collection systems each being mounted on one of a plurality of vehicles, each comprising:
        at least one sensor configured to collect electronic signals from proximal electronic devices as the mobile collection systems are moved about an area, wherein the electronic signals comprise RFID signals, Wi-Fi signals, cellular signals, Bluetooth® or other wireless signals, a license plate reader, a camera, or combinations thereof, and
        a communication circuitry to transmit collected electronic signals; and
    an intelligence device positioned separate from the mobile collection systems and comprising:
        a database, and
        a correlation circuitry to:
            develop an electronic signature for each of the electronic devices, each electronic signature including information related to collected electronic signals of each electronic device, or combinations thereof, collected by one or more of the mobile collection systems,
            determine a correlation between one or more electronic signals of each electronic signature for each electronic device and a target based on routes traversed by the plurality of vehicles so as to identify targets within or moving about an area at least partially defined by one or more of the routes.

10. The surveillance system of claim 9, wherein the at least one sensor of each of the plurality of mobile collection systems includes at least one Bluetooth® antenna, Wi-Fi antenna, RFID antenna, RF antennas, or combinations thereof, each configured to collect the electronic signals.

11. The surveillance system of claim 9, wherein the target comprises at least one package, vehicle, a convoy, a person, a vehicle, a utility asset, a transmitting electronic device, or combinations thereof.

12. The surveillance system of claim 9, wherein one of the plurality of mobile collection systems are configured to be carried by a delivery vehicle, and wherein the correlation circuitry is configured to alert an operator if at least one package having an RFID tag or other transmitting electronic device associated therewith is removed from the delivery vehicle prior to reaching a selected location or destination.

13. The surveillance system of claim 9, wherein each mobile collection system includes a GPS location device configured to generate real-time location data for an identified target detected by the mobile collection system; and wherein the correlation circuitry is configured to transmit real-time location data of the identified target to an operator upon request or upon determination of the correlation.

14. The surveillance system of claim 1, wherein the correlation circuitry is configured to catalogue the identifying electronic signatures associated with the targets in the database together with a number of occurrences or discoveries of the identifying electronic signatures and identifying characteristics thereof to develop unique searchable identifying electronic signatures for each of the targets.

15. The surveillance system of claim 14, wherein the identifying characteristics comprise geographical coordinates along the route, time stamps, an identification of a source manufacturer of each electronic device, an electronic signal source type, unique ID, or combinations thereof.

16. A method comprising:
    collecting, via a plurality of collection systems positioned on a plurality of vehicles, electronic signals from proximal electronic devices while the plurality of vehicles move about a geographic area;
    transmitting collected electronic signals to an intelligence device;
    determining a correlation between one or more different electronic signals of the collected electronic signals and one or more targets based upon a probability that a certain electronic signal or combination of electronic signals collected from the electronic devices are associated with a target meets a prescribed threshold probability;
    developing patterns of electronic signals or electronic signatures present within or moving about the geographic area; and
    tracking, based on the correlation between the electronic signals and the one or more targets, a real-time location of at least one target of the one or more of the targets and determining, based on data generated via tracking, one or more a status of package delivery, a predicted next location of an identified target, multiple identified targets traveling together, a relationship between identified targets, or combinations thereof.

17. The method of claim 16, wherein collecting the electronic signals by each of the plurality of collection systems includes detecting and capturing RFID signals, Wi-Fi signals, cellular signals, or other wireless signals, license plate or other vehicle identifying information, images, video, or combinations thereof.

18. The method of claim 16, wherein one or more of the proximal electronic devices correspond to one or more of a building, utility assets, or a second plurality of vehicles, and further comprising:
    determining, based on the correlation, one or more of an interior occupancy for each of the one or more buildings, one or more of availability or status of the utility assets, a known-visitor report for the utility assets, or a route for an evacuation and rescue operation.

19. The method of claim 16, wherein the one of one or more collection systems are carried by a delivery vehicle, and wherein the electronic signals are generated from RFID tags or other transmitting device carried by one or more packages, and further comprising generating an alert if a collected electronic signal indicates a package is removed from the delivery vehicle prior to reaching a selected location or destination.

20. The method of claim 16, further comprising developing associations between one or more electronic devices and targets and determining if at least one associated electronic device and target are typical to the geographic area or are atypical to the geographic area based on a consistency and/or frequency of detected correlations between identified electronic signatures and one or more targets within the geographic area.

* * * * *